US012230877B2

(12) United States Patent
Kwak et al.

(10) Patent No.: US 12,230,877 B2
(45) Date of Patent: Feb. 18, 2025

(54) ANTENNA STRUCTURE AND ELECTRONIC DEVICE WITH SAME

(71) Applicant: Samsung Electronics Co., Ltd., Gyeonggi-do (KR)

(72) Inventors: Woongeun Kwak, Gyeonggi-do (KR); Jungsik Park, Gyeonggi-do (KR); Sunghyup Lee, Gyeonggi-do (KR); Heeseok Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 366 days.

(21) Appl. No.: 17/573,131

(22) Filed: Jan. 11, 2022

(65) Prior Publication Data

US 2022/0224003 A1  Jul. 14, 2022

Related U.S. Application Data

(63) Continuation of application No. PCT/KR2022/000086, filed on Jan. 4, 2022.

(30) Foreign Application Priority Data

Jan. 13, 2021  (KR) ........................ 10-2021-0004910

(51) Int. Cl.
*H01Q 1/52* (2006.01)
*H01Q 1/38* (2006.01)
(Continued)

(52) U.S. Cl.
CPC ................ *H01Q 1/52* (2013.01); *H01Q 1/38* (2013.01); *H01Q 1/48* (2013.01); *H04N 23/51* (2023.01); *H04N 23/52* (2023.01); *H04N 23/54* (2023.01)

(58) Field of Classification Search
CPC .. H01Q 1/52; H01Q 1/38; H01Q 1/48; H04N 23/51; H04N 23/54; H04N 23/52
See application file for complete search history.

(56) References Cited

U.S. PATENT DOCUMENTS

| 10,389,007 | B1 | 8/2019 | Choi et al. |
| 12,010,255 | B2 * | 6/2024 | Nam ...................... H01Q 1/243 |

(Continued)

FOREIGN PATENT DOCUMENTS

| CN | 106340724 | 1/2017 |
| JP | 2007-208859 | 8/2007 |

(Continued)

OTHER PUBLICATIONS

International Search Report dated Apr. 18, 2022 issued in counterpart application No. PCT/KR2022/000086, 11 pages.

(Continued)

*Primary Examiner* — Olisa Anwah
(74) *Attorney, Agent, or Firm* — The Farrell Law Firm, P.C.

(57) ABSTRACT

Disclosed is an electronic device may include a housing including a plate including a first surface, and a support bracket including a (1-1)th side wall extending from an edge of the first surface and a (1-2)th side wall separated from the (1-1)th side wall by a first segmented portion, a camera bracket electrically connected to the (1-2)th side wall of the housing, and a printed circuit board disposed within the housing. An antenna pattern provided on the support bracket may include a conductive portion forming at least a portion of the (1-1)th side wall, and a ground portion connected to the conductive portion may be located between the camera bracket and the first segmented portion.

20 Claims, 16 Drawing Sheets

(51) Int. Cl.
  *H01Q 1/48* (2006.01)
  *H04N 23/51* (2023.01)
  *H04N 23/52* (2023.01)
  *H04N 23/54* (2023.01)

(56) References Cited

U.S. PATENT DOCUMENTS

| | | | |
|---|---|---|---|
| 2015/0173245 A1* | 6/2015 | Chung | H04M 1/0277 |
| | | | 361/752 |
| 2017/0033812 A1 | 2/2017 | Son et al. | |
| 2017/0351164 A1* | 12/2017 | Kim | H04N 23/51 |
| 2018/0267390 A1* | 9/2018 | Kim | H04N 23/52 |
| 2018/0301787 A1 | 10/2018 | Han et al. | |
| 2019/0058814 A1* | 2/2019 | Jung | H04N 23/51 |
| 2020/0012353 A1* | 1/2020 | Kim | G06F 3/0383 |
| 2020/0127382 A1 | 4/2020 | Lee et al. | |
| 2020/0194872 A1* | 6/2020 | Han | H01Q 1/243 |
| 2020/0373669 A1 | 11/2020 | Xue et al. | |
| 2021/0384630 A1 | 12/2021 | Kim et al. | |
| 2022/0086328 A1 | 3/2022 | Yu et al. | |

FOREIGN PATENT DOCUMENTS

| | | | |
|---|---|---|---|
| JP | 2018-074519 | 5/2018 | |
| KR | 1020170013682 | 2/2017 | |
| KR | 1020190020533 | 3/2019 | |
| KR | 10-2019-0131112 | 11/2019 | |
| KR | 1020190140209 | 12/2019 | |
| KR | 1020200008644 | 1/2020 | |
| KR | 10-2020-0044455 | 4/2020 | |
| KR | 1020200092135 | 8/2020 | |
| KR | 1020200101218 | 8/2020 | |
| KR | 1020220089344 | 6/2022 | |
| WO | WO-2018139692 A1 * | 8/2018 | H01Q 1/22 |

OTHER PUBLICATIONS

European Search Report dated Feb. 15, 2024 Issued in counterpart application No. 22739550.6-1205, 11 pages.

* cited by examiner

ANTENNA STRUCTURE AND ELECTRONIC DEVICE WITH SAME

PRIORITY

This application is a Bypass Continuation application of International Application No. PCT/KR2022/000086, which was filed on Jan. 4, 2022, and is based on and claims priority under 35 U.S.C. § 119 to Korean Patent Application No. 10-2021-0004910, which was filed in the Korean Intellectual Property Office on Jan. 13, 2021, the entire disclosure of each of which is incorporated herein by reference.

BACKGROUND

1. Field

Various embodiments of the disclosure relate to an antenna structure and an electronic device including the same.

2. Description of Related Art

Due to the rapid development of information communication and semiconductor technologies, for example, the distribution and use of various electronic devices are rapidly increasing. In particular, recent electronic devices are being developed such that users are capable of communicating with each other while carrying the electronic devices.

Typically, an electronic device may mean a device that performs a specific function according to a program provided therein (e.g., an electronic scheduler, a portable multimedia reproducer, a mobile communication terminal, a tablet PC, an image/sound device, a desktop/laptop PC, or a vehicle navigation system), as well as a home appliance. The above-mentioned electronic devices may output, for example, information stored therein as sound or an image. As the degree of integration of electronic devices has increased and ultra-high-speed and large-capacity wireless communication has become popular, multiple functions have recently come to be provided in a single electronic device, such as a mobile communication terminal. For example, various functions, such as an entertainment function (e.g., a game function), a multimedia function (e.g., a music/video reproducing function), a communication and security function (e.g., mobile banking), a schedule management function, and an e-wallet function, are integrated in a single electronic device, in addition to a communication function. Such an electronic device has been miniaturized so that a user can conveniently carry the electronic device.

In an electronic device, a structure utilizing a conductive portion of a housing as an antenna pattern needs to be designed to reduce interference that tends to occur between the antenna pattern and surrounding metal components. An electronic device may be designed such that an electrical influence is reduced by disposing a conductive portion of a housing that is used as an antenna and a camera module (and a bracket that covers the camera module) to be spaced apart from each other. For example, the camera module and the bracket that covers the camera module may be located within an opening provided in a front (or rear) plate of the housing, rather than in an edge area of the housing. Accordingly, antenna interference caused between the conductive portion disposed in the edge area and the camera module disposed to be spaced apart from the conductive portion may be reduced; however, design aesthetics may not be favorable in such a structure. according to an embodiment of the disclosure, since the camera module and the camera bracket covering the camera module provide a portion of the edge area of the housing, a new structure capable of limiting antenna interference is required.

SUMMARY

The disclosure has been made to address at least the above-mentioned problems and/or disadvantages and to provide at least the advantages described below.

According to various embodiments of the disclosure, it is possible to reduce the size of the camera bracket to provide a beautiful design by electrically connecting the camera bracket and a conductive portion of the housing that is used as an antenna.

According to various embodiments of the disclosure, it is possible to prevent an induced current from scattering by providing a segmented portion adjacent to the camera bracket and providing a ground between the camera bracket and the segmented portion. Accordingly, it is possible to reduce interference between the camera bracket and the conductive portion of the housing that is used as an antenna.

An antenna structure according to various embodiments of the disclosure may include a conductive portion and a segmented portion, and the segmented portion may be disposed at a position spaced apart from a camera bracket covering the camera module. Accordingly, it is possible to improve antenna performance by limiting a current generated in a feeding part of the antenna structure from moving through the camera bracket.

An antenna structure according to various embodiments of the disclosure includes a conductive portion and a segmented portion, and a ground portion is disposed between the camera bracket covering the camera module and the segmented portion. Thus, it is possible to restrict additional antenna resonance generated through the camera bracket and thus to improve the antenna performance.

According to various embodiments of the disclosure, an electronic device may include a housing including a plate including a first surface, and a support bracket including a $(1-1)^{th}$ side wall extending from an edge of the first surface and a $(1-2)^{th}$, side wall separated from the $(1-1)^{th}$ side wall by a first segmented portion, a camera bracket electrically connected to the $(1-2)^{th}$ side wall of the housing, and a printed circuit board disposed within the housing. An antenna pattern formed on the support bracket may include a conductive portion forming at least a portion of the $(1-1)^{th}$ side wall, and a ground portion connected to the conductive portion may be located between the camera bracket and the first segmented portion.

According to various embodiments of the disclosure, an electronic device may include a rear plate disposed to cover a rear surface of the electronic device and including a recess structure provided in an edge area, a camera bracket disposed along the recess structure and at least partially exposed outward, a support bracket including a $(1-1)^{th}$ side wall connected to the rear plate and a $(1-2)^{th}$ side wall separated from the $(1-1)^{th}$ side wall and connected to the camera bracket, and an antenna pattern formed on the support bracket and including a conductive portion forming at least a portion of the $(1-1)^{th}$ side wall, wherein at least one segmented portion located at one end of the conductive portion may be spaced apart, by a first distance, toward the $(1-1)^{th}$ side wall, from a first portion on the $(1-2)^{th}$ side wall extending from the edge surface of the camera bracket.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
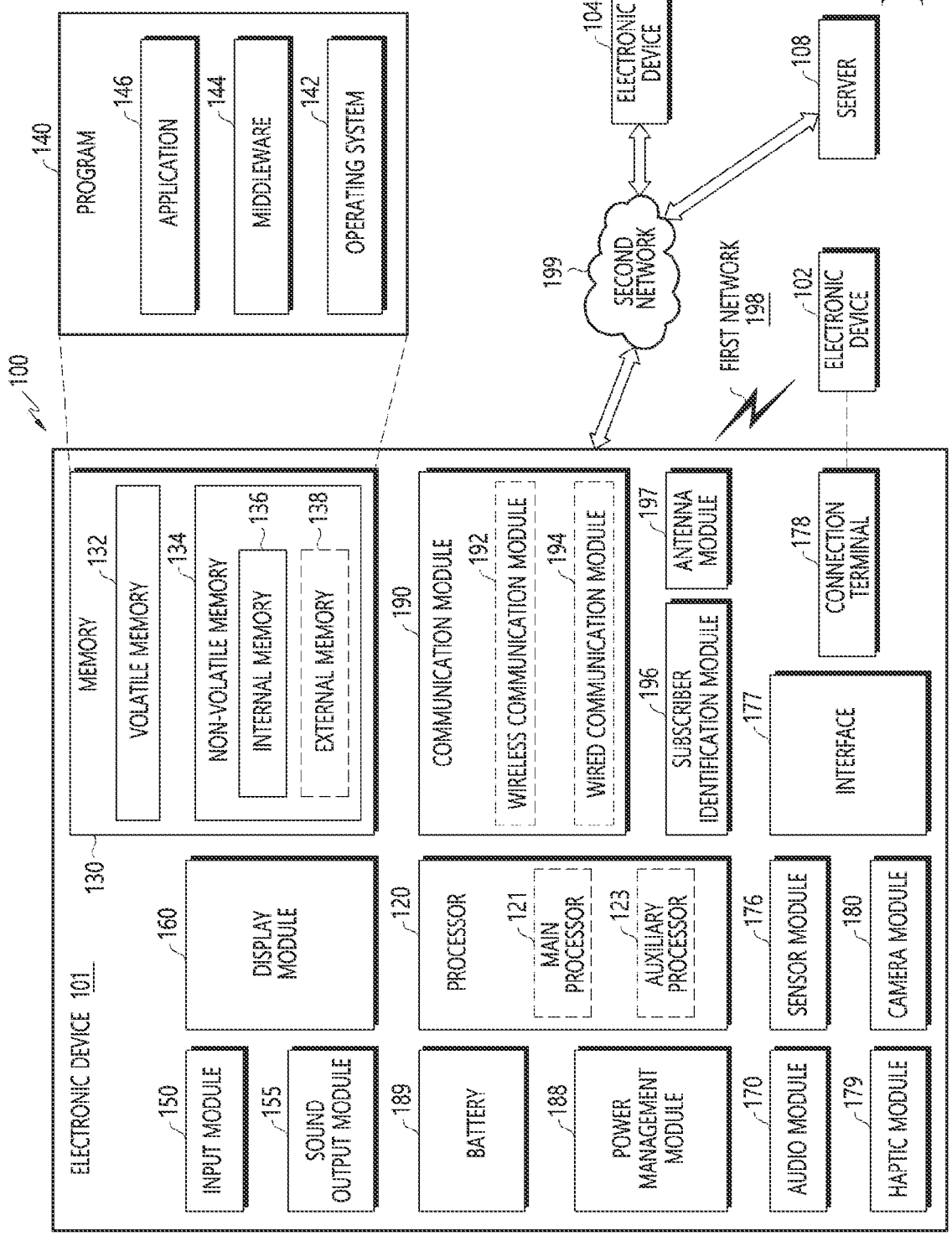
FIG. 1 is a block diagram of an electronic device in a network environment according to various embodiments

Hereinafter, embodiments of the disclosure will be described in detail with reference to the accompanying drawings. It should be noted that, in the drawings, the same or like elements are designated by the same or like reference signs as much as possible. In the following description and drawings, a detailed description of known functions or configurations that may make the subject matter of the disclosure unnecessarily unclear will be omitted.

FIG. 1 is a block diagram illustrating an electronic device in a network environment according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
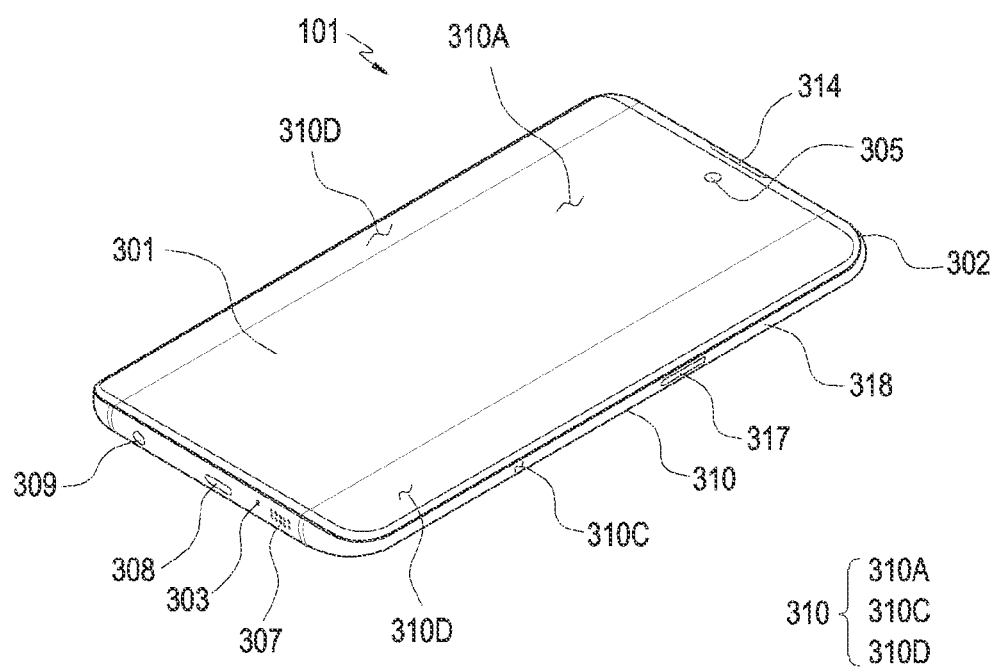
FIG. 2 is a front perspective view illustrating an electronic device according to various embodiments of the disclosure.

FIG. 2 is a front perspective view illustrating an electronic device according to various embodiments of the disclosure.

Figure 3:
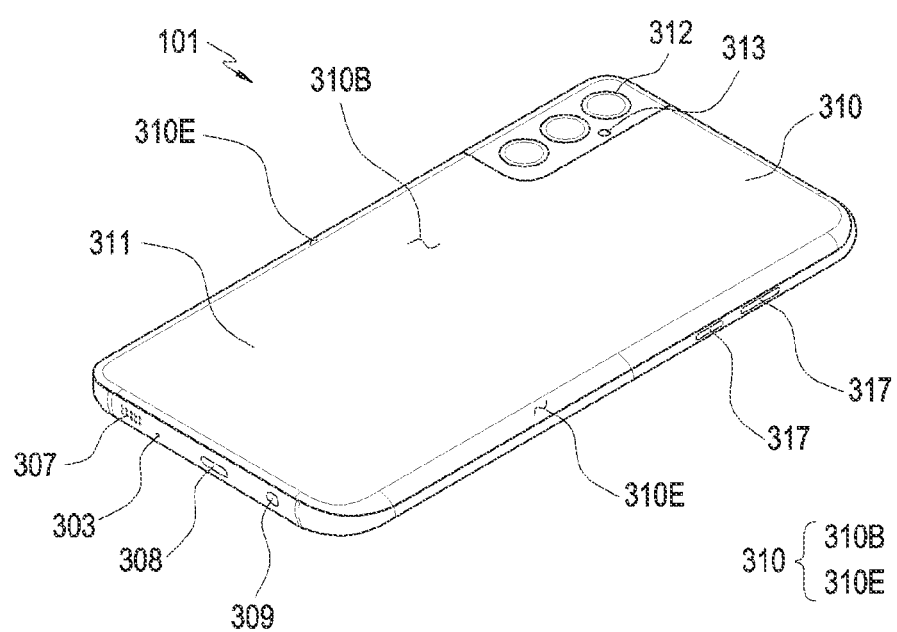
FIG. 3 is a rear perspective view illustrating the electronic device according to various embodiments of the disclosure.

FIG. 3 is a rear perspective view illustrating the electronic device according to various embodiments of the disclosure.

Referring to FIGS. 2 and 3, an electronic device 101 according to an embodiment may include a housing 310 including a front surface 310A, a rear surface 310B, and a side surface 310C surrounding a space between the front surface 310A and the rear surface 310B. In another embodiment (not illustrated), In another embodiment (not illustrated), the term housing 310 may refer to a structure providing a part of the front surface 310A, the rear surface 310B, and the side surface 310C in FIG. 2. According an embodiment, at least a portion of the front surface 310A may be provided by a substantially transparent front plate 302 (e.g., a glass plate or a polymer plate including various coating layers). The rear surface 310B may be provided by a rear plate 311 made of glass, ceramic, a polymer, a metal (e.g., aluminum, stainless steel (STS), or magnesium), or a combination of two or more of these materials. The side surface 310C may be provided by a side bezel structure (or a side member) 318 coupled to the front plate 302 and the rear plate 311 and including a metal and/or a polymer. In some embodiments, the rear plate 311 and the side bezel structure 318 may be integrally configured and may include the same material.

In FIG. 2, the front plate 302 may include, at the long opposite side edges thereof, two first edge areas 310D, which are bent from the front surface 310A toward the rear plate 311 and extend seamlessly. In FIG. 3, the rear plate 311 may include, at the long opposite side edges thereof, two second edge areas 310E, which are bent from the rear surface 310B toward the front plate 302 and extend seamlessly. In some embodiments, the front plate 302 or the rear plate 311 may include only one of the first edge areas 310D (or the second edge areas 310E). In another embodiment, some of the first edge areas 310D or the second edge areas 310E may not be included. When viewed from a side of the electronic device 101, the side bezel structure 318 may have a first thickness (or width) on the side surface portions that do not include the first edge areas 310D or the second edge areas 310E described above, and may have a second thickness, which is less than the first thickness, on the side surface portions that include the first edge areas 310D or the second edge areas 310E.

According to an embodiment, the electronic device 101 may include at least one of a display device 301, audio modules 303, 307, and 314 (e.g., the audio module 170 in FIG. 1), a sensor module (e.g., the sensor module 176 in FIG. 1), camera modules 305, 312, and 313 (e.g., the camera module 180 in FIG. 1), a key input device 317 (e.g., the input module 150 in FIG. 1), and connector holes 308 and 309 (e.g., the connection terminal 178 in FIG. 1). In some embodiments, in the electronic device 101, at least one of the components (e.g., the connector hole 309) may be omitted, or other components may be additionally included.

According to an embodiment, the display 301 may be visually exposed through a substantial portion of the front plate 302. In some embodiments, at least a portion of the display 301 may be exposed through the front plate 302 defining the front surface 310A and the first edge areas 310D. In some embodiments, the edges of the display 301 may be configured to be substantially the same as the shape of the periphery of the front plate 302 adjacent thereto. In another embodiment, the distance between the periphery of the display 301 and the periphery of the front plate 302 may be substantially constant in order to enlarge the exposed area of the display 301.

According to an embodiment, the front plate 302 of the housing 310 may include a screen display area provided as the display 301 is visually exposed. For example, the screen display area may include the front surface 310A and the first edge areas 310D.

In another embodiment (not illustrated), a part of the screen display area (e.g., the front surface 310A and the first edge areas 310D) of the display 301 may define a recess or an opening and may include at least one of an audio module 314, a sensor module (not illustrated), and a light-emitting element (not illustrated), and a camera module 305, which are aligned with the recess or the opening. In another embodiment (not illustrated), The rear surface of the screen display area of the display 301 may include at least one of the audio module 314, the sensor module (not illustrated), the camera module 305, the fingerprint sensor (not illustrated), and the light-emitting element. In another embodiment (not illustrated), The display 301 may be coupled to or disposed adjacent to a touch-sensitive circuit, a pressure sensor capable of measuring a touch intensity (pressure), and/or a digitizer configured to detect a magnetic-field-type stylus pen. In some embodiments, at least some of the key input devices 317 may be disposed in the first edge areas 310D and/or the second edge areas 310E.

According to an embodiment, the audio modules 303, 307, and 314 may include a microphone hole 303 and speaker holes 307 and 314. The microphone hole 303 may be disposed therein to acquire external sound, and In some embodiments, a plurality of microphones may be disposed therein to be able to detect the direction of sound. The speaker holes 307 and 314 may include an external speaker hole 307 and a phone call receiver hole 314. In some embodiments, the speaker holes 307 and 314 and the microphone hole 303 may be implemented as a single hole, or a speaker may be included therein without the speaker holes 307 and 314 (e.g., a piezo speaker). The audio modules 303, 307, and 314 are not limited to the above-described structure, and depending on the structure of the electronic device 101, the design of the audio modules may be changed such that some of the audio modules are mounted or a new audio module is added.

According to an embodiment, sensor modules may generate an electrical signal or a data value corresponding to an internal operating state of the electronic device 101 or an external environmental state. The sensor modules (not illustrated) may include a first sensor module (e.g., a proximity sensor) and/or a second sensor module (e.g., a fingerprint sensor) disposed on the front surface 310A of the housing 310, and/or a third sensor module (e.g., a heart rate monitor (HRM) sensor) and/or a fourth sensor module (e.g., a fingerprint sensor) disposed on the rear surface 310B of the housing 310. (not illustrated), The fingerprint sensor may be disposed not only on the front surface 310A of the housing 310, but also on the rear surface 310B. In another embodiment (not illustrated), The sensor modules may be disposed in one area of the display panel so as not to be recognized from the outside. The electronic device 101 may further include at least one of a gesture sensor, a gyro sensor, an atmospheric pressure sensor, a magnetic sensor, an acceleration sensor, a grip sensor, a color sensor, an IR sensor, a biometric sensor, a temperature sensor, a humidity sensor, or an illuminance sensor. The sensor modules are not limited to the above-described structure, and, depending on the structure of the electronic device 101, the design of the sensor modules may be changed such that some of the sensor modules are mounted or a new sensor module is added.

According to an embodiment, the camera modules 305, 312, and 313 may include a front camera module 305 disposed on the front surface 310A of the electronic device 101, a rear camera module 312 disposed on the rear surface 310B, and/or a flash 313. The camera modules 305 and 312 may include one or more lenses, an image sensor, and/or an image signal processor. The flash 313 may include a light-emitting diode (LED) or a xenon lamp. In some embodiments, two or more lenses (e.g., an IR camera, a wide-angle lens, and a telephoto lens), and image sensors may be disposed on one surface of the electronic device 101. The camera modules 305, 312, and 313 are not limited to the above-described structure, and depending on the structure of the electronic device 101, the design of the camera modules may be changed such that some of the camera modules are mounted or a new camera module is added.

According to an embodiment, the electronic device 101 may include a plurality of camera modules (e.g., a dual camera or a triple camera) having different properties (e.g., angles of view) or functions, respectively. For example, a plurality of camera modules 305 and 312 including lenses having different angles of view may be configured, and the electronic device 101 is capable of controlling the change of the angles of view of the camera modules 305 and 312 executed therein based on a user's selection. For example, at least one of the plurality of camera modules 305 and 312 may be a wide-angle camera, and at least another of the camera modules may be a telephoto camera. Similarly, at least one of the plurality of camera modules 305 and 312 may be a front camera, and at least another of the camera modules may be a rear camera. In addition, the plurality of camera modules 305 and 312 may include at least one of a wide-angle camera, a telephoto camera, or an IR camera (e.g., a time-of-flight (TOF) camera, or a structured light camera). According to an embodiment, the IR camera may be operated as at least part of a sensor module. For example, the TOF camera may be operated as at least a part of a sensor module for detecting a distance to a subject.

According to an embodiment, the key input devices 317 may be disposed on the side surface 310C of the housing 310. In another embodiment, the electronic device 101 may not include some or all of the above-mentioned key input devices 317, and a key input device that is not included in the above-mentioned key input devices, may be implemented in another type, such as a soft key, on the display 301. In some embodiments, a key input device may include a sensor module 316 disposed on the second surface 310B of the housing 310.

According to an embodiment, light-emitting elements (not illustrated) may be disposed on, for example, the front surface 310A of the housing 310. The light-emitting elements (not illustrated) may provide, for example, information about the state of the electronic device 101 in an optical form. In another embodiment, the light-emitting elements (not illustrated) may provide a light source that is interlocked with, for example, the operation of the front camera module 305. The light-emitting elements (not illustrated) may include, for example, an LED, an IR LED, and/or a xenon lamp.

According to an embodiment, the connector holes 308 and 309 may include a first connector hole 308 capable of accommodating a USB connector for transmitting/receiving power and/or data to/from an external electronic device, and/or a second connector hole 309 capable of accommodating a connector (e.g., an earphone jack) for transmitting/receiving an audio signal to/from an external electronic device.

According to an embodiment, some of the camera modules 305 and 312 and/or some sensor modules of the sensor modules may be disposed to be exposed to the outside through at least a portion of the display 301. For example, the camera modules 305 may include a punch hole camera disposed inside a hole or recess provided in the rear surface of the display 301. According to an embodiment, the camera modules 312 may be disposed inside the housing 310 such that the lens is exposed to the second surface 310B of the electronic device 101. For example, the camera modules 312 may be disposed on a PCB 340.

According to an embodiment, the camera modules 305 and/or the sensor modules may be disposed from the internal space of the electronic device 101 to the front plate 302 of the display 301 to come into contact with the external environment through a transparent area. In addition, some sensor modules 304 may be disposed in the internal space in the electronic device so as to implement the functions thereof without being visually exposed through the front plate 302.

Figure 4:
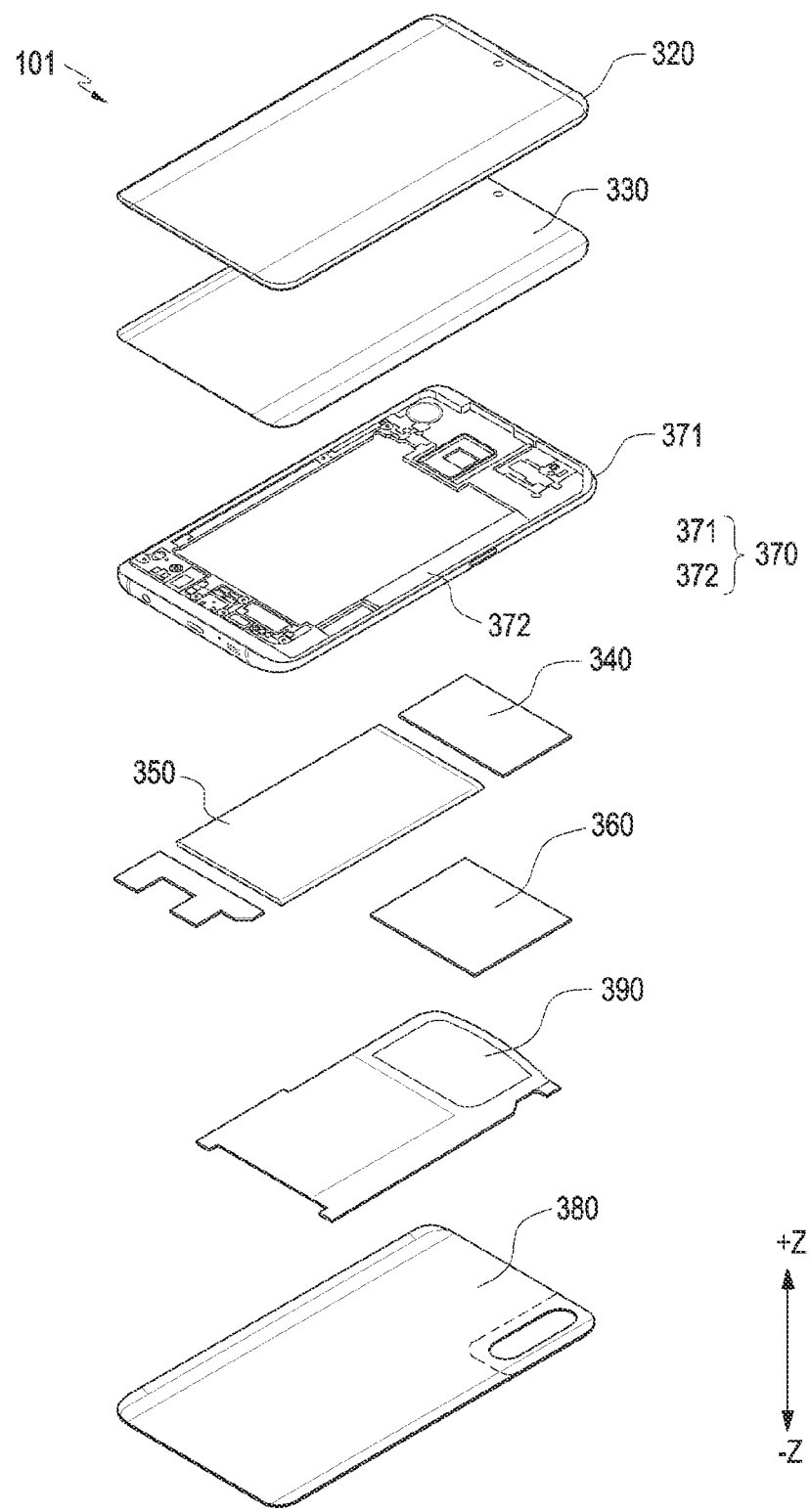
FIG. 4 is an exploded perspective view illustrating the electronic device according to various embodiments of the disclosure.

FIG. 4 is an exploded perspective view illustrating the electronic device according to various embodiments of the disclosure.

Referring to FIG. 4, the electronic device 101 (e.g., the electronic device 101 in FIGS. 1 to 3) according to various embodiments may include a support bracket 370, a front plate 320 (e.g., the front plate 302 in FIG. 2), a display 330 (e.g., the display 301 in FIG. 2), a printed circuit board 340 (e.g., a PCB, flexible PCB (FPCB), or a rigid flexible PCB (RFPCB)), a battery 350 (e.g., the battery 189 in FIG. 1), a second support member 360 (e.g., the rear case), an antenna 390 (e.g., the antenna module 197 in FIG. 1), and a rear plate 380 (e.g., the rear plate 311 in FIG. 2). The support bracket 370 of the electronic device 101 according to an embodiment may include a side bezel structure 371 (e.g., the side bezel structure 318 in FIG. 2) and a first support member 372.

In some embodiments, in the electronic device 101, at least one of the components (e.g., the first support member 372 or the second support member 360) may be omitted, or other components may be additionally included. At least one of the components of the electronic device 101 may be the same as or similar to at least one of the components of the electronic device 101 in FIG. 2 or FIG. 3, and a redundant description thereof will be omitted.

According to various embodiments, the first support member 372 may be disposed inside the electronic device 101 to be connected to the side bezel structure 371, or may be integrated with the side bezel structure 371. The first support member 372 may be formed of a metal material and/or a non-metal material (e.g., a polymer). The display 330 may be coupled to one surface of the first support member 372, and the PCB 340 may be coupled to the other surface of the first support member 372.

According to various embodiments, on the printed circuit board 340, a processor, a memory, and/or an interface may be mounted. The processor may include one or more of a central processing unit, an application processor, a graphics processor, an image signal processor, a sensor hub processor, or a communication processor. According to various embodiments, the PCB 340 may include a flexible PCB type radio frequency cable (RFC). For example, the printed circuit board 340 may be disposed on at least a portion of the first support member 372, and may be electrically connected to an antenna module (e.g., the antenna module 197 in FIG. 1) and a communication module (e.g., the communication module 190 in FIG. 1).

According to an embodiment, the memory may include a volatile memory or a nonvolatile memory.

According to an embodiment, the interface may include a high-definition multimedia interface (HDMI), a USB interface, an SD card interface, and/or an audio interface. The interface may electrically or physically connect the electronic device 101 to an external electronic device and may include a USB connector, an SD card/a multimedia card (MMC) connector, or an audio connector.

According to various embodiments, the battery 350 is for supplying power to at least one component of the electronic device 101 and may include a non-rechargeable primary battery, a rechargeable secondary battery, or a fuel cell. At least a portion of the battery 350 may be disposed on substantially the same plane as the PCB 340. The battery 350 may be integrally disposed inside the electronic device 101, or may be detachably disposed on the electronic device 101.

According to various embodiments, the second support member 360 (e.g., the rear case) may be disposed between the PCB 340 and the antenna 390. For example, the second support member 360 may include one surface to which at least one of the PCB 340 and the battery 350 is coupled, and the other surface to which the antenna 390 is coupled.

According to various embodiments, the antenna 390 may be disposed between the rear plate 380 and the battery 350. The antenna 390 may include a near field communication (NFC) antenna, a wireless charging antenna, and/or a magnetic secure transmission (MST) antenna. The antenna 390 may perform short-range communication with an external electronic device, or may wirelessly transmit/receive power required for charging to/from the external device in a wireless manner. In another embodiment, an antenna structure may be constituted with a part of the side bezel structure 371 and/or the first support member 372, or a combination thereof.

According to various embodiments, the rear plate 380 may define at least a portion of the rear surface (e.g., the second surface 310B in FIG. 3) of the electronic device 101.

Figure 5:
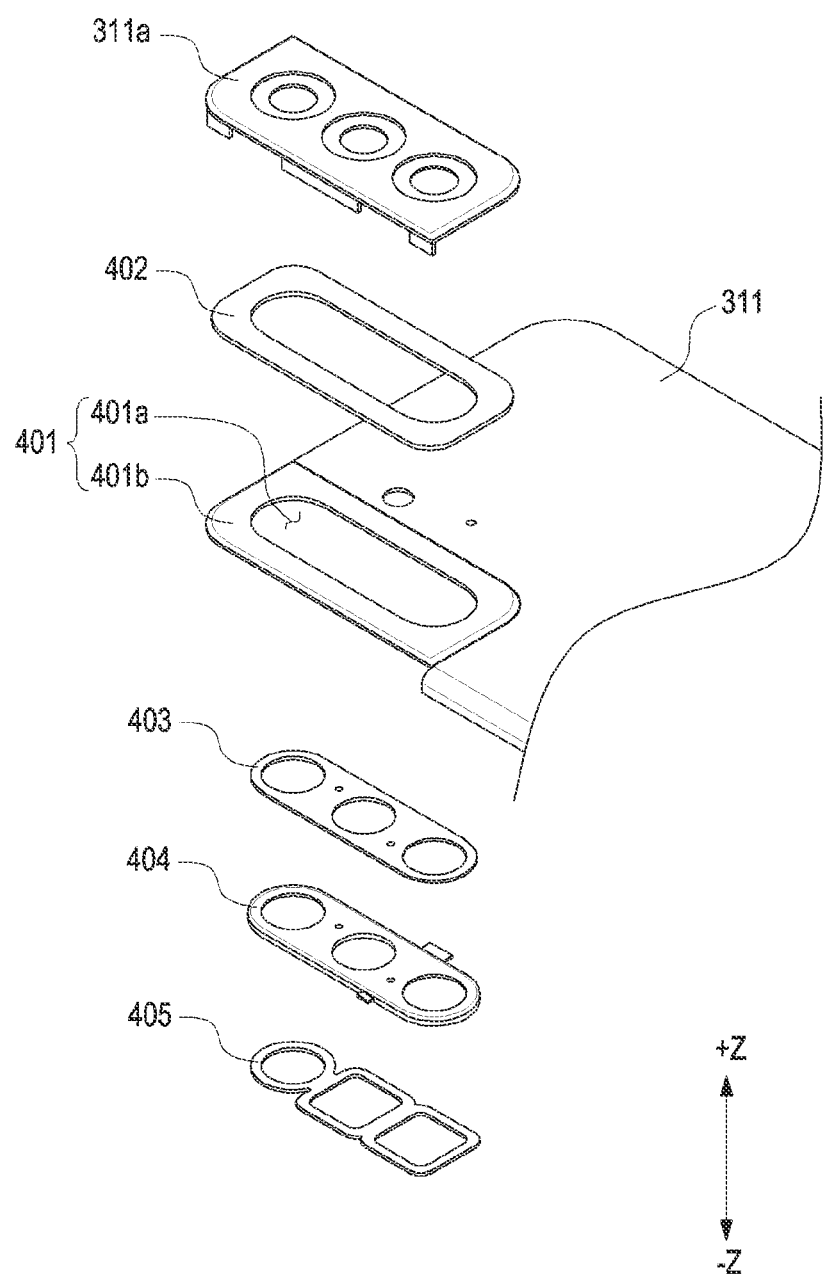
FIG. 5 is an exploded perspective view of a stacked structure between a camera bracket connected to a rear plate of an electronic device and adjacent components according to various embodiments of the disclosure.
Figure 6:
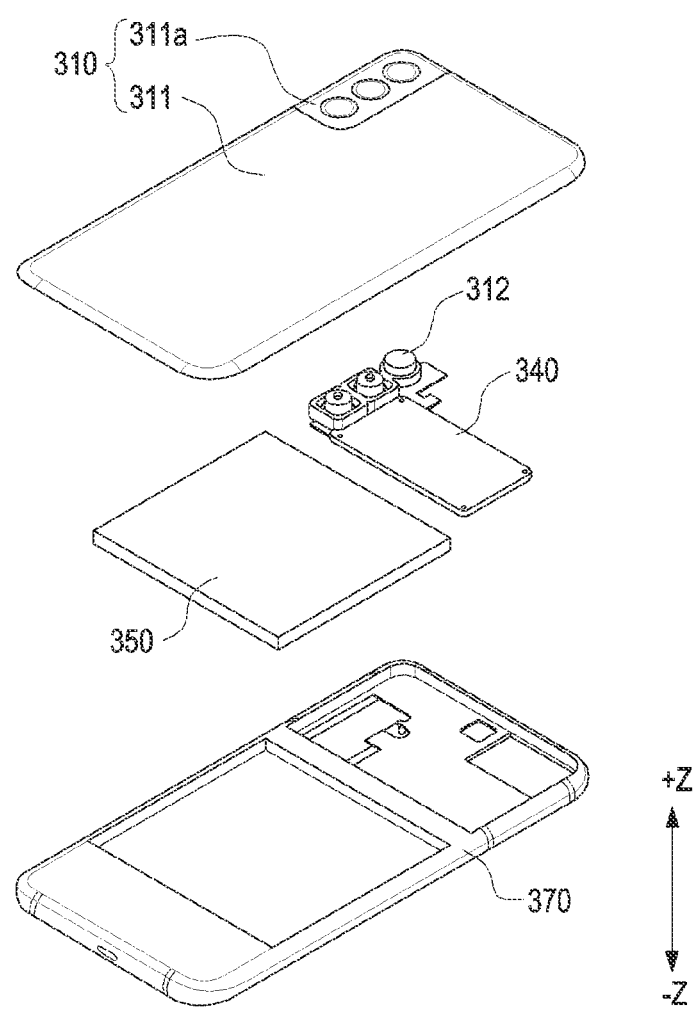
FIG. 6 illustrates a rear plate and a support bracket which are separated before assembling an electronic device according to various embodiments of the disclosure.
Figure 7:
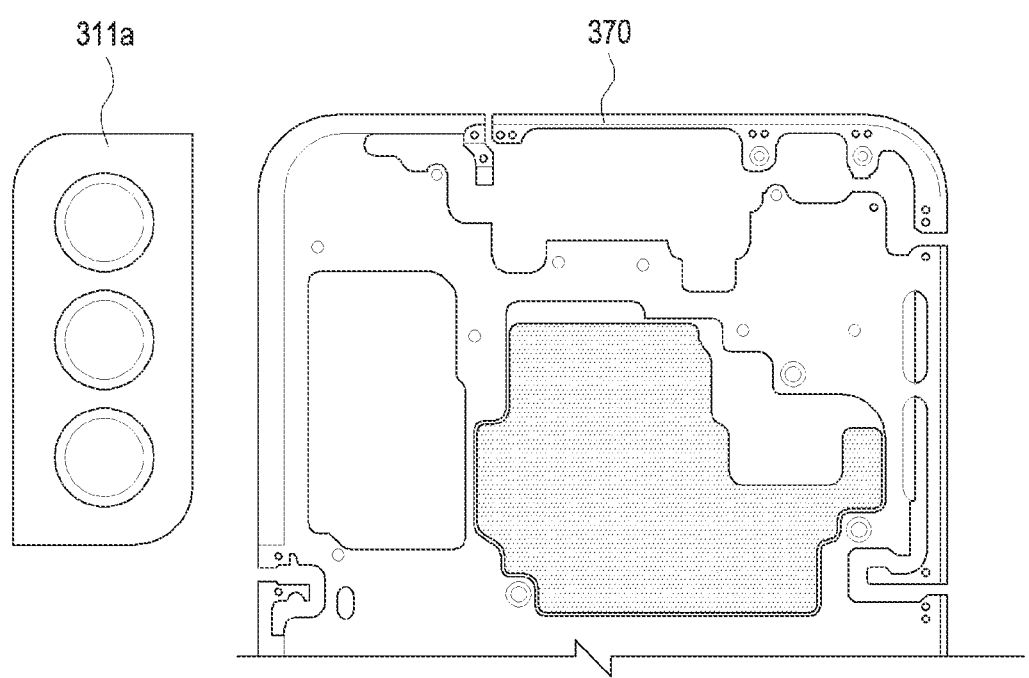
FIG. 7 is a rear view of an electronic device before a camera bracket is coupled to a support bracket, according to various embodiments of the disclosure.

FIG. 5 is an exploded perspective view of a stacked structure between a camera bracket connected to a rear plate of an electronic device according to various embodiments of the disclosure. FIG. 6 illustrates a rear plate and a support bracket which are separated before assembling an electronic device according to various embodiments of the disclosure. FIG. 7 is a rear view of an electronic device before a camera bracket is coupled to a support bracket, according to various embodiments of the disclosure.

According to various embodiments, an electronic device 101 may include a housing 310, a camera module 312, a PCB 340, and a battery 350. The housing 310 may include a rear plate 311 covering the rear surface of the electronic device 101 and a first camera bracket 311a.

Some or all of the configurations of the housing 310, the camera module 312, the PCB 340, and the battery 350 of FIGS. 5, 6 and 7 may be the same as the configurations of the housing 310 and the camera module 312 of FIGS. 2 and 3 and the PCB 340 and the battery 350 of FIG. 4.

According to various embodiments, the first surface oriented in the +Z-axis direction of the housing 310 may be provided by the rear plate 311 and the first camera bracket 311a of the camera module 312. For example, the rear plate 311 may include a recess structure 401 provided in an edge area, and the first camera bracket 311a having a shape corresponding to the shape of the recess structure 401 may be disposed along the recess structure 401 to be exposed to the outside. The recess structure 401 may include various shapes, such as an opening, a hole, or a groove, having different thicknesses compared to adjacent areas.

According to various embodiments, the recess structure 401 located in the edge area of the rear plate 311 may include an opening 401a in which at least some lenses are located such that a plurality of lens assemblies of the camera module 312 face the outside, and an edge portion 401b provided along the periphery of the opening 401a in a closed loop shape. According to an embodiment, the edge portion 401b of the recess structure 401 may include a material (e.g., glass) that may be the same as and may extend from the rear plate 311. The edge portion 401b of the recess structure 401 may be manufactured integrally with the rear plate 311. According to an embodiment, the thickness of the recess structure 401 of the rear plate 311 (e.g., the length in the +Z-axis/−Z-axis direction) may be less than or equal to the thickness of other portions of the rear plate 311.

According to various embodiments, an adhesive member 402 and a first camera bracket 311a may be disposed above the recess structure 401 in the +Z-axis direction, and below the recess structure 401 (e.g., in the −Z-axis direction), a lens protection member 403, a support member 404, and an elastic member 405 may be sequentially disposed. The adhesive member 402 may include a material for waterproofing.

According to various embodiments, the adhesive member 402 disposed on the edge portion 401b of the recess structure 401 may have a closed loop shape corresponding to the edge portion 401b, and may block foreign substances such that the foreign substances cannot enter the inside of the camera module 312 or the electronic device 101. The first camera bracket 311a may be disposed on the adhesive member 402, may be a separate component separated from the support bracket 370, and may include a metal material (e.g., aluminum).

According to various embodiments, the first camera bracket 311a may provide an outer rear surface of the electronic device 101 of the electronic device 101 together with the rear plate 311. The first camera bracket 311a may include one or more openings the number of which corresponds to the number of lens assemblies of the camera module 312, and may reduce an external shock transmitted to the camera module 312 to protect the camera module 312. When the first camera bracket 311a is assembled to the rear plate 311, the thickness of the first camera bracket 311a (e.g., the length in the +Z-axis/−Z-axis direction) may be greater than or equal to the thickness of other portions of the rear plate 311.

According to various embodiments, the support member 404 may support the lens assembly of the camera module 312 to prevent shaking, and may include a non-insulating material. The lens protection member 403 disposed above the support member 404 (e.g., in the +Z-axis direction) is configured to include openings the number of which corresponds to the number of lens assemblies, and the elastic member 405 disposed below the support member 404 (e.g., in the −Z-axis direction) may be made of a compressible material to prevent impact.

According to various embodiments, with reference to the recess structure 401 of the rear plate 311, the adhesive member 402 and the first camera bracket 311a are coupled in the +Z-axis direction and the lens protection member 403, the support member 404, and the elastic member 405 are assembled to form a stacked structure in the −Z-axis direction, and then the stacked structure and the support bracket 370 of the electronic device 101 may be coupled to each other. Since the first camera bracket 311a is a structure physically separated from the support bracket 370, the first camera bracket may be coupled via a separate member. For example, after various electronic components are mounted in the partitioned inner space of the support bracket 370, the coupled structure of the rear plate 311 and the recess structure 401 may be coupled to the support bracket 370 to cover the mounted electronic components. According to an embodiment, a camera module 312, a PCB 340, and a battery 350 may be included between the coupled structure and the support bracket 370.

Figure 8:
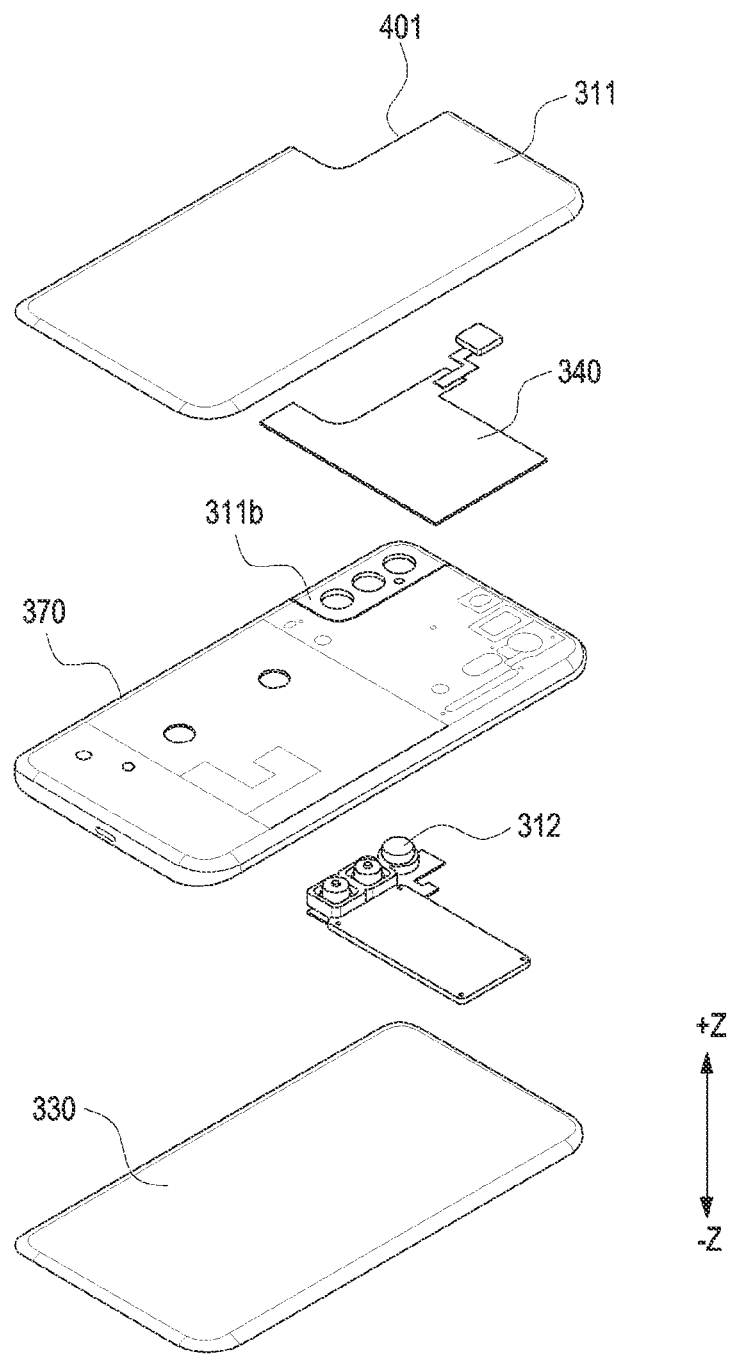
FIG. 8 illustrates a display device, a support bracket, and a rear plate separated before assembling an electronic device according to various embodiments of the disclosure.
Figure 9:
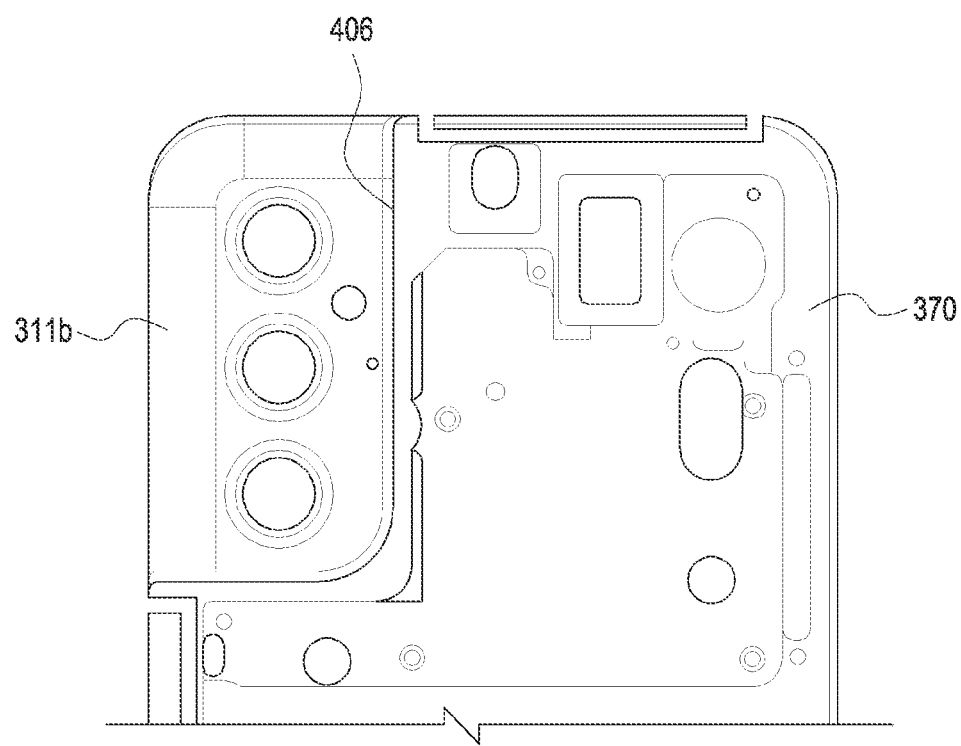
FIG. 9 illustrates a structure of a camera bracket portion connected to a rear plate of an electronic device according to various embodiments of the disclosure.

FIG. 8 illustrates a display device, a support bracket, and a rear plate separated before assembling an electronic device according to another one of various embodiments of the disclosure. FIG. 9 illustrates a structure of a camera bracket portion connected to a rear plate of an electronic device according to another one of various embodiments of the disclosure.

According to various embodiments, an electronic device 101 may include a housing 310, a camera module 312, and a PCB 340. The housing 310 may include a display assembly 330 stacked with a transparent plate that covers at least a portion of the front surface of the electronic device 101, and a rear plate 311 and a second camera bracket 311b that cover the rear surface.

All or some of the configurations of the housing 310, the display assembly 330, the camera module 312, and the PCB 340 of FIGS. 8 and 9 may be the same as the configurations of the housing 310, the display 330, and the camera module 312 of FIGS. 2 and 3 and the PCB 340 of FIG. 4.

According to various embodiments, the first surface oriented in the +Z-axis direction of the housing 310 may be provided by the rear plate 311 and the second camera bracket 311b of the camera module 312. For example, the rear plate 311 may include a first recess structure 401 provided in an edge area, and the second camera bracket 311a having a shape corresponding to the shape of the first recess structure 401 may be disposed along the first recess structure 401 to be exposed to the outside. According to an embodiment, the second camera bracket 311b may be provided in the second recess structure 406 of the support bracket 370. The second recess structure 406 may be configured to correspond to the first recess structure 401 of the rear plate 311. With reference to the second camera bracket 311b disposed in the second recess structure 406 of the support bracket 370, a lens protection member (not illustrated), a support member (not illustrated), and an elastic member may be sequentially disposed in the −Z-axis direction. The configurations of the lens protection member 403, the support member 404, and the elastic member 405 of FIG. 5 may be applicable to those of the lens protection member (not illustrated), the support member (not illustrated), and the elastic member (not illustrated).

According to various embodiments, the first recess structure 401 and/or the second recess structure 406 may include various shapes, such as an opening, a hole, or a groove, having different thicknesses compared to adjacent areas. Alternatively, the first recess structure 401 provided in the rear plate 311 may have a shape obtained by manufacturing in a "]" or "[" shape when viewed from above the rear plate 311 and then cutting one side of a corner of the rear plate 311. The second camera bracket 311b may be provided in a shape corresponding to the cut shape, and may be connected to the rear plate 311.

According to various embodiments, with reference to the support bracket 370, the rear plate 311 may be coupled in the +Z-axis direction, and the display assembly 330 may be coupled in the −Z-axis direction opposite to the +Z-axis direction. The support bracket 370 may include a partitioned inner space in which a side surface of the electronic device 101 and electronic components may be mounted. A front camera module and the PCB 340 may be mounted in the inner space of the support bracket 370 that is oriented in the +Z-axis direction, and the rear camera module 312 may be mounted in the inner space of the support bracket 370 that is oriented in the +Z-axis direction to face the second camera bracket 311*b*.

According to various embodiments, the second camera bracket 311*b* may be provided in an edge area of the support bracket 370 and disposed along the first recess structure 401 of the rear plate 311 to be exposed to the outside. For example, the second camera bracket 311*b* is provided to protrude from the edge area of the support bracket 370 in the +Z-axis direction, and may include at least one opening into which at least a portion of the lens assembly of the rear camera module 312 can be inserted. Alternatively, the second camera bracket 311*b* may be provided integrally with the support bracket 370 and may be manufactured by including the same metal material as the support bracket 370. Referring to FIGS. 8 and 9, since the second camera bracket 311*b* and the support bracket 370 are integrally manufactured compared to FIGS. 5, 6 and 7, an additional attachment area for attaching the second camera bracket 311*b* to the electronic device may be omitted. As a result, the size of the camera bracket may be reduced, thereby improving aesthetics in design.

Figure 10:
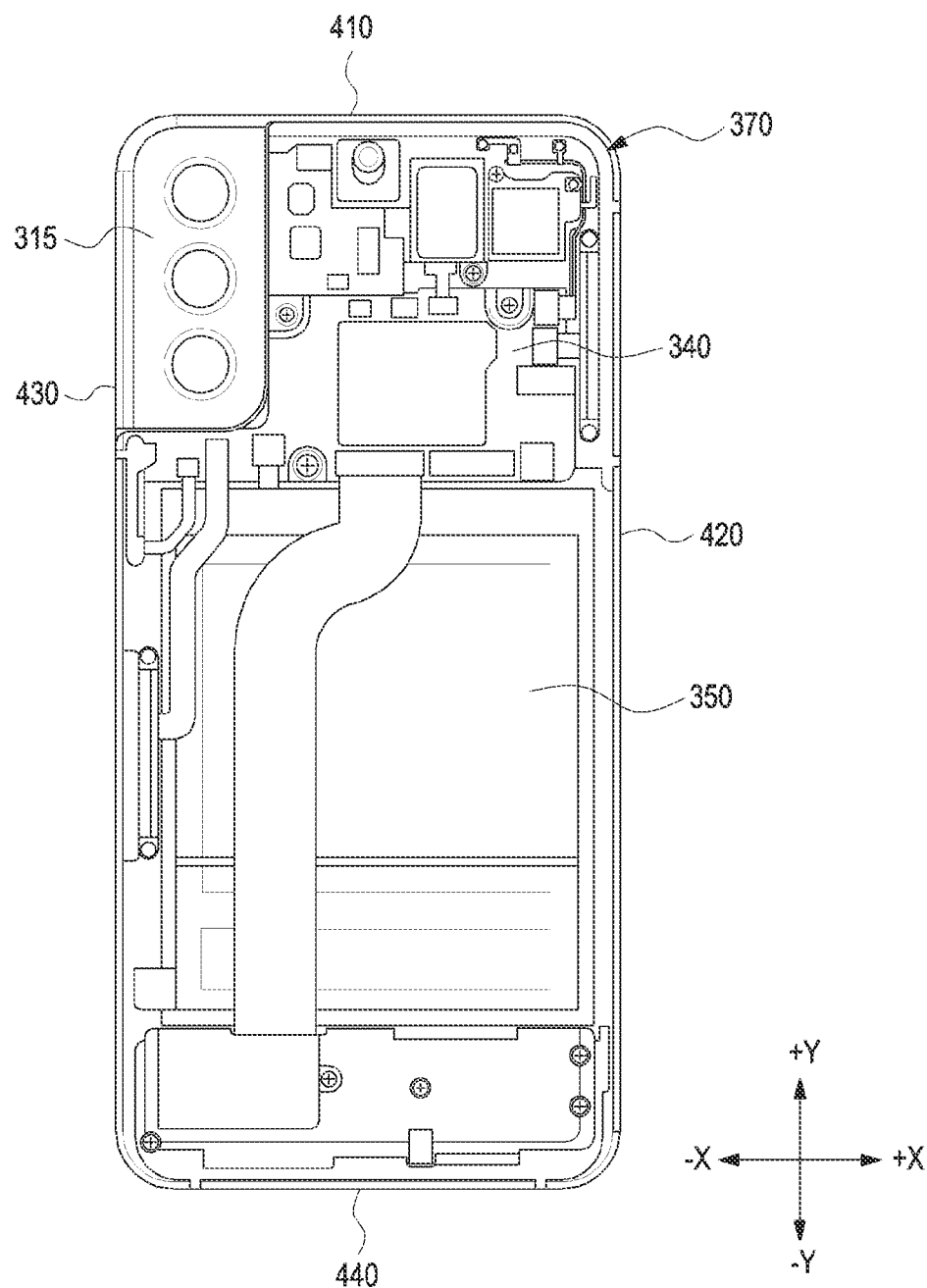
FIG. 10 illustrates the inside of an electronic device according to various embodiments of the disclosure.
Figure 11:
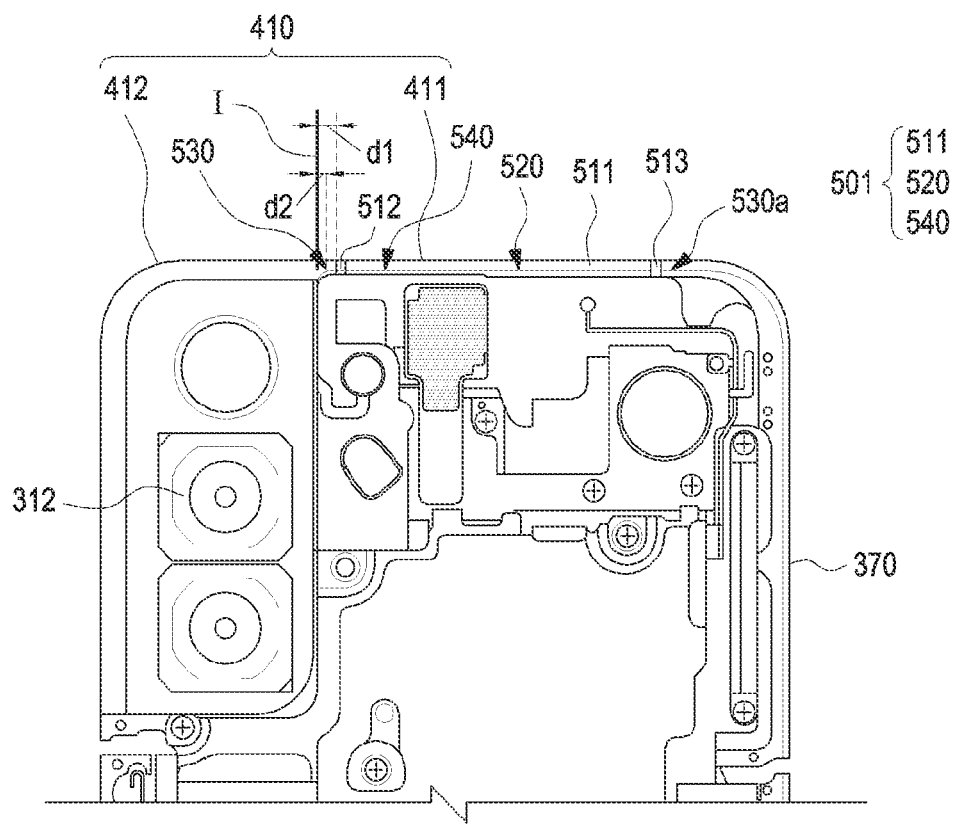
FIG. 11 illustrates an antenna structure of an electronic device from which a camera bracket is removed, according to various embodiments of the disclosure.
Figure 12:
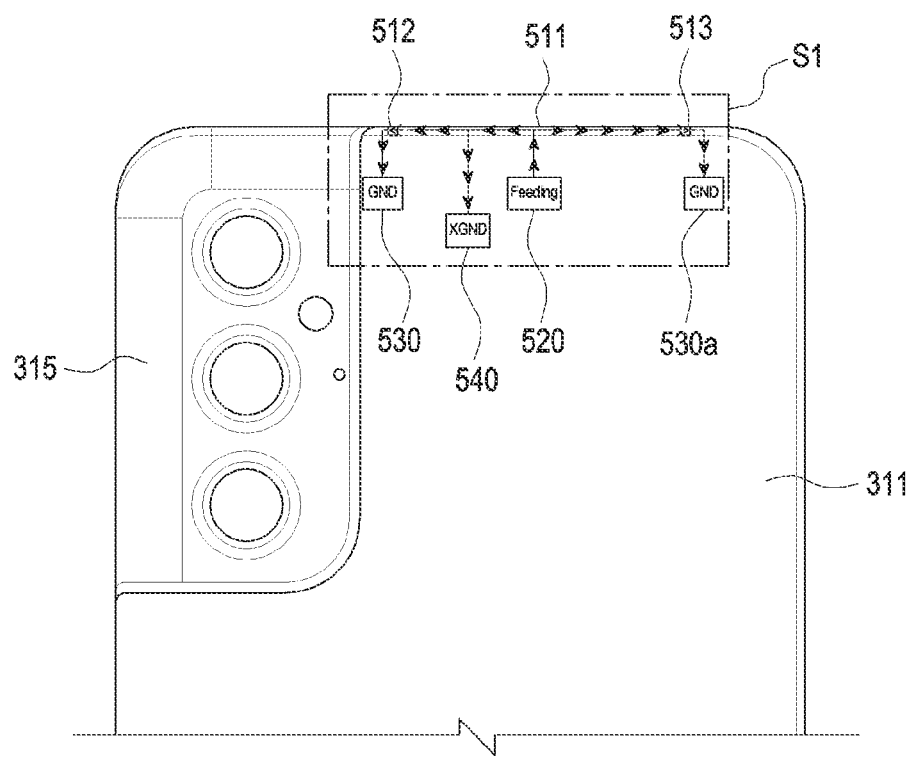
FIG. 12 illustrates an antenna structure in which a partial area of an electronic device is covered by a camera bracket, according to various embodiments of the disclosure.

FIG. 10 illustrates the inside of an electronic device according to various embodiments of the disclosure. FIG. 11 illustrates an antenna structure of an electronic device from which a camera bracket is removed, according to various embodiments of the disclosure. FIG. 12 illustrates an antenna structure in which a partial area of an electronic device is covered by a camera bracket, according to various embodiments of the disclosure.

According to various embodiments, an electronic device 101 may include a housing 310, a camera module 312, a PCB 340, and a battery 350. The housing 310 may include a support bracket 370 disposed along a side surface of the electronic device 101, a rear plate 311 covering the rear surface of the electronic device 101, and a camera bracket 315. The camera bracket 315 of FIGS. 10, 11 and 12 may include at least one of the first camera bracket 311*a* of FIGS. 5, 6 and 7 and the second camera bracket 311*b* of FIGS. 8 and 9.

Some or all of the configurations of the housing 310, the camera module 312, the PCB 340, and the battery 350 of FIGS. 10, 11 and 12 may be the same as the housing 310 and the camera module 312 of FIGS. 2 and 3 and the PCB 340 and the battery 350 of FIG. 4.

According to various embodiments, the housing 310 of the electronic device 101 may include a first surface (e.g., the rear surface) at least a portion of which is oriented in a first direction (e.g., the +Z-axis direction, a second surface (e.g., the front surface) at least a portion of which is oriented in a second direction (e.g., the −Z-axis direction) opposite to the first direction, and a side wall provided to surround an inner space defined between the first surface and the second surface. According to an embodiment, the first surface of the housing 310 may be provided by the rear plate 311 and the camera bracket 315 of the camera module 312. For example, the rear plate 311 may include a recess structure provided in an edge area, and the camera bracket 315 having a shape corresponding to the shape of the recess structure may be disposed along the recess structure to be exposed to the outside.

According to various embodiments, the side wall of the housing 310 may be provided by the side portion of the support bracket 370. The edge area of the support bracket 370 may have a closed loop shape, wherein a partial area of the edge area may be coupled to the rear plate 311, and another partial area may be coupled to the camera bracket 315. The edge area of the support bracket 370 has a substantially quadrilateral closed loop shape, and may include a first side wall 410, a second side wall 420, a third side wall 430, and a fourth side wall 440 oriented in different directions. For example, referring to FIG. 10, the first side wall 410 may include a surface facing the upper end (e.g., in the +Y-axis direction) of the electronic device 101, and may be coupled to the upper end of the rear plate 311 (e.g., in the +Y-axis direction) and the upper end of the camera bracket 315 (e.g., in the +Y-axis direction). The second side wall 420 may include a surface facing the right end of the electronic device 101 (e.g., in the +X-axis direction) and may be coupled to the right end of the rear plate 311 (e.g., in the +X-axis direction). The third side wall 430 may include a surface facing the left end of the electronic device 101 (e.g., in the −X-axis direction), and may be coupled to the left end of the rear plate 311 (e.g., in the −X-axis direction) and the left end of the camera bracket 315 (e.g., in the −X-axis direction). The fourth side wall 440 may include a surface facing the lower end of the electronic device 101 (e.g., in the −Y-axis direction) and may be coupled to the lower end of the rear plate 311 (e.g., in the −Y-axis direction). Alternatively, the corner areas of the support bracket 370 connected to each other among the first side wall 410, the second side wall 420, the third side wall 430, and the fourth side wall 440 may include seamlessly connected curved portions.

According to various embodiments, the electronic device 101 may include an antenna structure, and the antenna structure may include a plurality of antennas. According to an embodiment, a structure using a portion of the housing 310 disposed adjacent to the camera module 312 as an antenna will be described.

According to various embodiments, the antenna structure 501 may include an antenna pattern (e.g., a conductive portion 511), a feeding part 520, and a first ground part 540. The antenna structure 501 may be provided in an upper end area of the housing 310 disposed adjacent to the camera bracket 315. According to an embodiment, the antenna pattern may include at least a portion of the housing 310 (e.g., the support bracket 370) formed of a conductive material. For example, the housing 310 may include a conductive portion 511 at least partially formed of a metal material, and a non-conductive portion disposed adjacent to the conductive portion (hereinafter, a segmented portion 512 or 513) may be designed to be located at opposite ends of the conductive portion 511 so that the conductive portion 511 provides an arbitrary length in order to implement an antenna having a frequency band desired by a designer. Although not illustrated in the drawings, the feeding part 520 and/or the first ground part 540 may include a contact structure (e.g., a C-Clip or the like) for electrically connecting to the printed circuit board 340.

According to various embodiments, the edge area of the support bracket 370 may include a (1-1)$^{th}$ side wall 411 connected to the rear plate 311 and a (1-2)$^{th}$ side wall 411 disposed to be spaced apart from the (1-1)$^{th}$ side wall 411 and connected to the camera bracket 315. At least a portion of the (1-1)$^{th}$ side wall 411 may operate as an antenna. For example, the (1-1)$^{th}$ side wall 411 may protect components disposed inside the electronic device 101 and may provide a function of operating as an antenna. The conductive portion 511 of the (1-1)$^{th}$ side wall 411 acting as an antenna may be configured to transmit and/or receive radio frequency (RF) signals.

According to an embodiment, one or more segmented portions 512 or 513 may be located at end or opposite ends of the (1-1)$^{th}$ side wall 411. The segmented portions 512 or 513 may provide an antenna by being located to separate the opposite ends of the conductive portion 511 of the (1-1)$^{th}$ side wall 411 from adjacent conductive portions. For example, the segmented portions 512 or 513 may be formed through processes such as etching, cutting, and stamping of the surface of the support bracket 370 such that the side walls of the housing 310 are divided into a plurality of conductive portion 511, and the pieces formed through the above-mentioned processes may be insulated from each other by the segmented portion 512 or 513.

According to an embodiment, the segmented portions 512 or 513 may include a first segmented portion 512 and a second segmented portion 513 located at opposite ends of the conductive portion 511. The first segmented portion 512 may be located to separate the (1-1)$^{th}$ side wall 411 from other side walls. The first segmented portion 512 may be disposed to be spaced apart, by a first distance d1, from a portion (e.g., the boundary surface I) of the (1-2)h side wall 412 toward the (1-1)$^{th}$ side wall 410. For example, the interface I may be an edge surface of the camera bracket 315. Alternatively, the boundary surface I may be a portion of the (1-2)$^{th}$ side wall located on the same line as the edge surface of the camera bracket 315.

According to an embodiment, the first segmented portion 512 may be designed so as not to separate the (1-2)$^{th}$ side wall 412. For example, since the (1-2)$^{th}$ side wall 412 is electrically connected to the camera bracket 315, when the (1-2)$^{th}$ side wall 412, rather than the (1-1)$^{th}$ side wall 411, is separated by segment, the current transmitted to the camera bracket 315 may be scattered on the camera bracket 315. Accordingly, since there is no current returning to the ground unit after the feeding part, antenna radiation is eliminated.

According to an embodiment, the second segmented portion 513 may be located to separate the (1-1)$^{th}$ side wall 411 and may be disposed at a greater distance than the first segmented portion 512 with reference to the boundary surface I. Since the length of the conductive portion 511 is determined depending on the position of the second segmented portion 513, a designer may change the design of the second segmented portion 513 such that the second segmented portion is located at various positions depending on a desired bandwidth.

According to an embodiment, the first segmented portion 512 and/or the second segmented portion 513 may be a non-conductive portion and may provide a dielectric constant different from that of the conductive portion 511. For example, the first segmented portion 512 and/or the second segmented portion 513 may be referred to as an opening, a recess, or a groove provided to separate the (1-1)$^{th}$ side wall 411. Alternatively, the first segmented portion 512 and/or the second segmented portion 513 may be filled with an insulating material for insulation, such as an elastomer material, ceramic, mica, glass, plastic, a metal oxide, air and/or an arbitrary insulative material including another material that is superior in insulative property to metal, but is not limited thereto.

According to various embodiments, the antenna structure 501 may include an antenna pattern, a feeding part 520, and a first ground part 540. According to an embodiment, the feeding part 520 may extend inwardly from the (1-1)$^{th}$ side wall 411 of the support bracket 370. The feeding part 520 may be electrically connected to the PCB 340 in the housing 310 to transmit a current to the antenna pattern (e.g., the conductive portion 511). For example, a transmission/reception (Tx/Rx) terminal of a communication circuit disposed on the PCB 340 may be connected in series with the feeding part 520 to communicate. The communication circuit may include any type of element, such as a switch, resistive element, a capacitive element, an inductive element, or any combination thereof to selectively provide series coupling with the feeding part 520. Elements in a communication circuit may be used to selectively change the antenna frequency band.

In FIG. 11, the feeding part 520 extends in a direction perpendicular to the (1-1)$^{th}$ side wall 411, but is not limited thereto. The design of the feeding part may be changed to a configuration having a different thickness and/or angle.

According to an embodiment, the second ground parts 530 and 530a may be at least a portion extending to the inside of the housing 310 from a conductive portion forming an antenna. For example, the second ground parts 530 and 530a may be electrically connected to a portion of the PCB 340 and/or a portion of the support bracket 370 in the electronic device 101. Alternatively, the second ground parts 530 and 530a may include a conductive member disposed between an end extending inwardly from the (1-1)$^{th}$ side wall 411 and a portion of the PCB 340. Conductive members, such as a wire, a C-clip, a screw, and a conductive sponge, may electrically connect the second ground parts 530 and 530a and the portion of the PCB 340.

According to various embodiments, the second ground parts 530 and 530a may be disposed adjacent to the segmented portions 512 or 513. Since the second ground portions 530 and 530a are disposed adjacent to the first segmented portion 512 between the conductive portion 511 of the first side wall 410 used as an antenna and the camera bracket 315, the conductive portion 511 and the camera bracket 315 may be electrically separated. According to an embodiment, the (1-2)$^{th}$ side walls 412 connected to the camera bracket 315, the second ground parts 530 and 530a, the first segmented portion 512, and the feeding part 520 may be sequentially disposed. For example, when viewed toward the first side wall 410 of the housing 310, the ground portion 530 may be disposed to be spaced apart by a second distance d2 toward the first segmented portion 512, from the boundary surface I between the (1-1)$^{th}$ side wall 411 and the (1-2)$^{th}$ side wall 412. According to another embodiment, the second ground parts 530 and 530a may be designed by limiting the second ground parts not to be located on the (1-2)$^{th}$ side wall 412 or on the third side wall 430 connected to the camera bracket 315). When the second ground parts 530 and 530a are provided on the (1-2)th side wall 412 (or on the third side wall 430 connected to the camera bracket 315), the conductive area (e.g., a length) may be extended by a portion other than the conductive portion 511 connected to the feeding part 520 (e.g., the (1-2)$^{th}$ side wall 412 connected to the camera bracket 315). The resonance generated due to the extended area may induce the current transmitted from the feeding part 520 and may reduce the overall antenna gain.

According to an embodiment, the first segmented portion 512 and the second segmented portion 513 may be designed to physically separate the conductive portion 511 in order to design an antenna, and the second ground parts 530 and 530a may be designed to be adjacent to the boundary surface I of the (1-2)$^{th}$ side wall 412 in order to cut off the electrical coupling between the conductive portion 511 of the (1-1)$^{th}$ side wall 411 and the (1-2)$^{th}$ side wall 412.

According to an embodiment, the first ground part 540 may be disposed between the first segmented part 512 and the feeding part 520. For example, the first ground part 540 may be electrically connected to a portion of the support bracket 370. The first ground part 540 is configured to change an impedance for adjusting a frequency band, wherein the first ground part 540 may include a switch and may be electrically connected to the PCB 340. For example, the first ground part 540 provides various electrical lengths by switching to a direct ground without passing through an inductor, a capacitor, a combination thereof, or an intermediate element at a ground stage to create resonances desired by designers in the physically identical antenna pattern. As another example, the first ground part may be at least a portion extending from the (1-1)$^{th}$ side wall 411 to the inside of the housing 310. According to an embodiment, the first ground part 540 may be connected to a portion of the PCB 340 within the electronic device 101 directly or via a conductive member. For example, the conductive member may include at least one of members such as a wire, a c-clip, a screw, and a conductive sponge.

In a ground connected to an active element, the active element may be at least one of a transistor, a filter, a pulse amplitude modulation (PAM) and a ground switch. According to an embodiment, the second ground parts 530 and 530a and/or the first ground part 540 may be a ground related to leakage current from a gate/a base such as a field effect transistor (FET) inside an IC/TR to a drain/an emitter. The second ground parts 530 and 530a and/or the first ground part 540 may be of an element electrically connected to a feeding part of another conductive portion.

Referring to FIG. 12, a flow of current according to an arrangement relationship of respective components of an antenna structure is illustrated. According to an embodiment, when an area S1 above the rear plate 311 of the housing 310 is viewed, the camera bracket 315, the (2-1)$^{th}$ ground part 530, the first ground part 540, the feeding part 520, and the (2-2)$^{th}$ ground part 530a may be disposed to be spaced apart from each other. The current provided from the feeding part 520 may be transmitted to the conductive part 511 to be directed toward the second ground parts 530 and 530a. For example, the current directed toward the camera bracket 315 may be branched and delivered to the (2-1)$^{th}$ ground part 530 and the first ground part 540. Alternatively, the current directed in the direction away from the camera bracket 315 may be transmitted to the (2-1)$^{th}$ ground part 530a. According to an embodiment, since the conductive portion 511 and the (2-1)$^{th}$ ground part 530 are disposed to be spaced apart from each other due to the first segmented portion 512, the currents provided from the feeding part 520 may generate a coupling effect so as to flow from the conductive portion 511 to the second ground parts 530 and 530a. Since the conductive portion 511 and the (2-2)$^{th}$ ground part 530a are disposed to be spaced apart from each other due to the second segmented portion 513, the currents provided from the feeding part 520 may generate a coupling effect so as to flow from the conductive portion 511 to the (2-2)$^{th}$ ground parts 530 and 530a.

Figure 13:
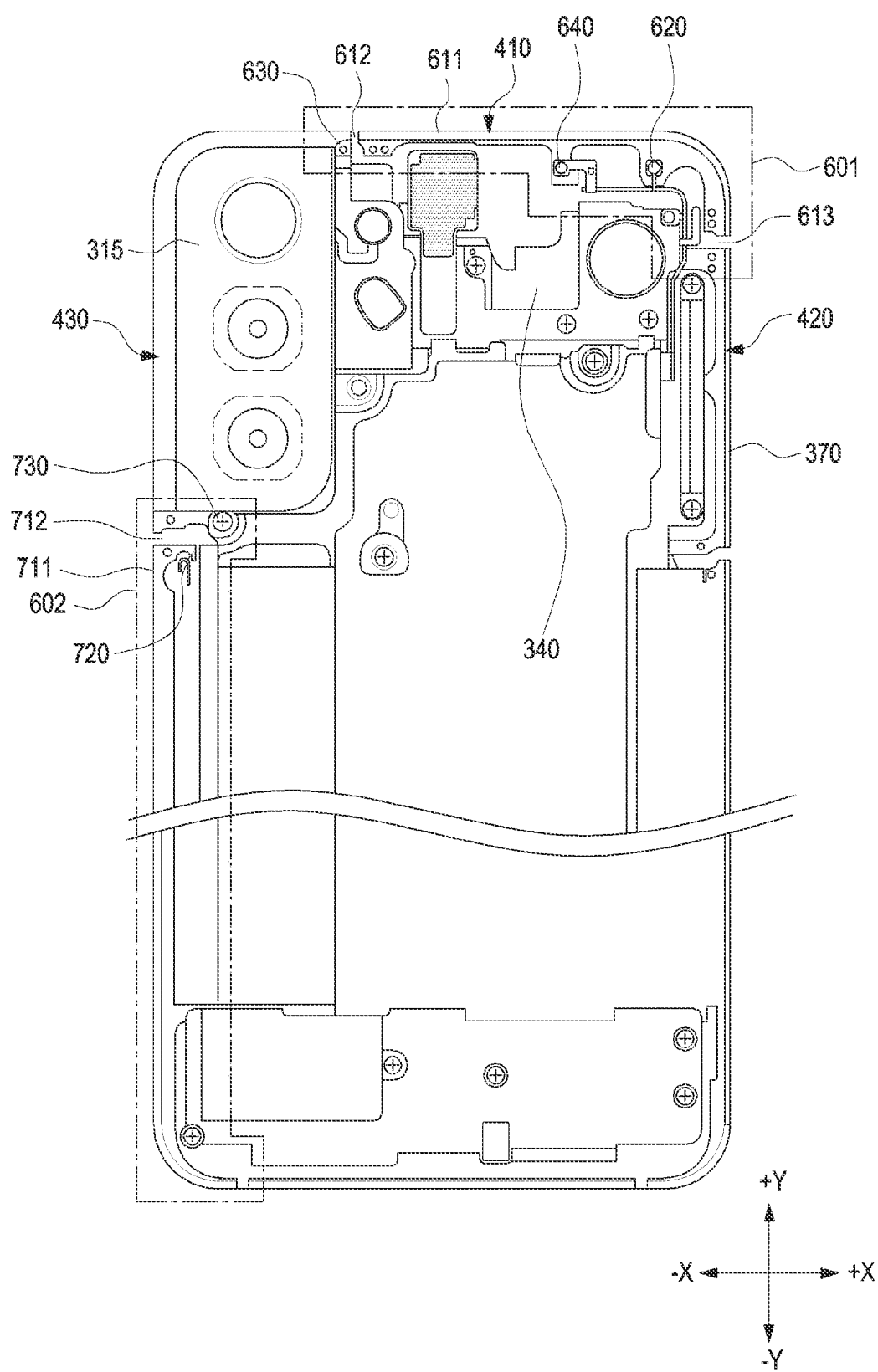
FIG. 13 illustrates an antenna structure in which a partial area of an electronic device is covered by a camera bracket, according to various embodiments of the disclosure.
Figure 14:
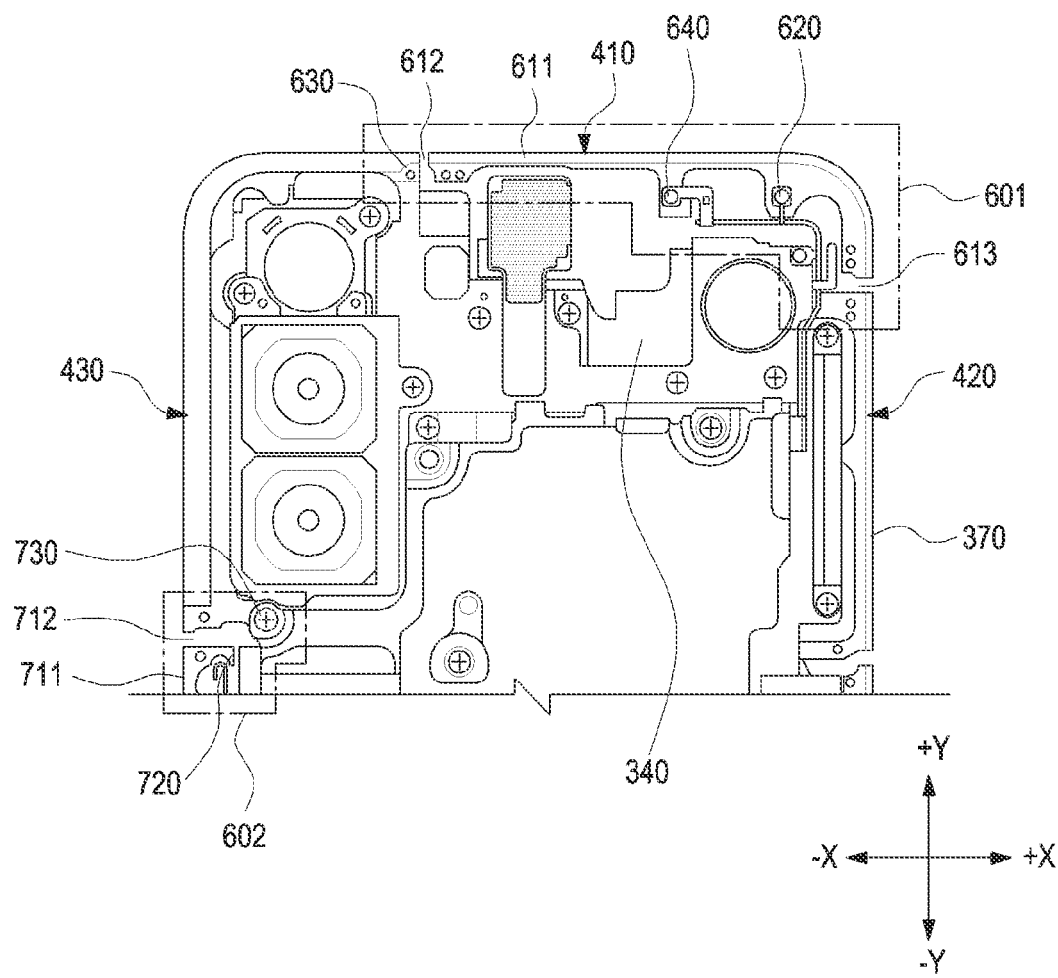
FIG. 14 illustrates an antenna structure of the electronic device from which the camera bracket is removed in FIG. 13.
Figure 15:
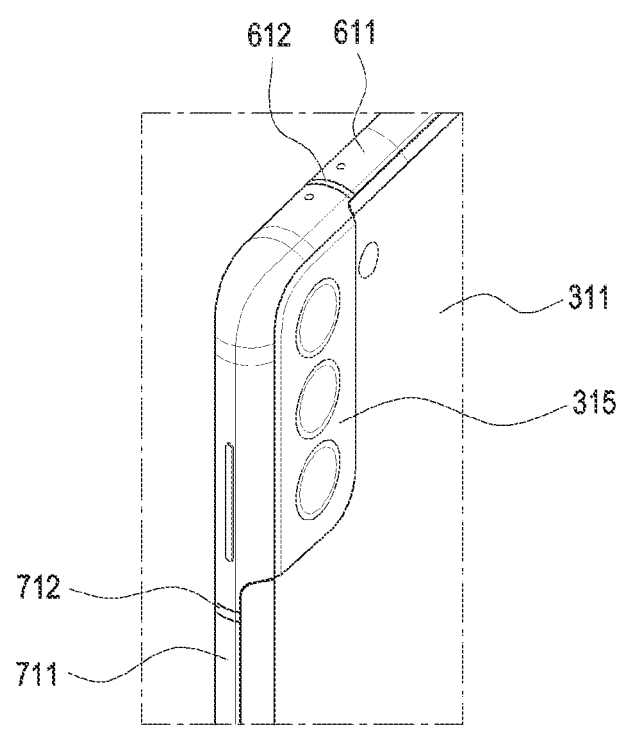
FIG. 15 illustrates at least a portion of a side surface of an electronic device according to various embodiments of the disclosure.

FIG. 13 illustrates an antenna structure in which a partial area of an electronic device is covered by a camera bracket, according to various embodiments of the disclosure. FIG. 14 illustrates an antenna structure of the electronic device from which the camera bracket is removed in FIG. 13. FIG. 15 illustrates at least a portion of a side surface of an electronic device according to various embodiments of the disclosure.

According to various embodiments, an electronic device 101 may include a housing 310, a camera module 312, and a PCB 340. The housing 310 may include a support bracket 370 disposed along a side surface of the electronic device 101, a rear plate 311 covering the rear surface of the electronic device 101, and a camera bracket 315. The camera bracket 315 of FIGS. 13 to 15 may include at least one of the first camera bracket 311a of FIGS. 5, 6 and 7 and the second camera bracket 311b of FIGS. 8 and 9.

Some or all of the configurations of the housing 310, the camera module 312, and the PCB 340 of FIGS. 13, 14 and 15 may be the same as the housing 310 and the camera module 312 of FIGS. 2 and 3 and the PCB 340 and the battery 350 of FIG. 4.

According to various embodiments, the electronic device 101 may include an antenna structure having a plurality of antennas. According to an embodiment, a structure using a portion of the housing 310 disposed adjacent to the camera module 312 as an antenna will be described. Some or all of the antenna structures of the electronic device of FIGS. 13, 14 and 15 may be the same as those of the electronic device of FIGS. 10, 11 and 12. Hereinafter, differences will be mainly described.

According to various embodiments, the electronic device 101 may include a plurality of antenna structures. The electronic device 101 may include a first antenna structure 601 and a second antenna structure 602, wherein the first antenna structure 601 may be designed in the upper portion of the electronic device 101 (e.g., the surface of the support bracket 370 oriented in the +Y-axis direction) and a peripheral area of the same, and the second antenna structure 602 may be designed in a left portion of the electronic device 101 (e.g., the surface of the support bracket 370 oriented in the −X-axis direction) and a peripheral area of the same. According to an embodiment, the electronic device 101 may further include a third antenna structure and a fourth antenna structure, wherein the third antenna structure may be designed in a lower portion of the electronic device 101 (e.g., the surface of the support bracket 370 oriented in the −Y-axis direction) and a peripheral area of the same, and the fourth antenna structure may be designed in a right portion of the electronic device 101 (e.g., the surface of the support bracket 370 oriented in the +X-axis direction) and the peripheral area thereof. According to the illustrated embodiment, the first antenna structure 601 and the second antenna structure 602 will be mainly described, but the disclosure is not limited thereto, and the antenna structure may be designed in various areas using the conductive portions of the housing 310 of the electronic device 101. According to various embodiments, the first antenna structure 601 may include a first conductive portion 611, a first feeding part 620, and a (1-1)$^{th}$ ground part 640. The first antenna pattern may include a first conductive portion 611 disposed in an area adjacent to the camera bracket 315 and provided by the segmented portions 612 and 613 located at opposite ends of the first conductive portion 611. For example, when the rear surface of the electronic device 101 is viewed, the first antenna structure 601 may be provided to face the right direction (e.g., in the X-axis direction) with reference to the camera bracket 315 disposed in the left upper end area of the electronic device.

According to an embodiment, the edge area of the housing 310 may include a first side wall 400 oriented in the +Y-axis direction and connected to the rear plate 311 and a second side wall 420 oriented in the +X-axis direction perpendicular to the +Y-axis direction and extending from the first side wall 410. The first conductive portion 611 for operating as an antenna may extend from the first side wall 410 to the second side wall 420. According to an embodiment, the connecting portion between the first side wall 410 and the second side wall 420 may extend seamlessly to form a curved surface. The curved surface may form a sequential inclination from the +Y-axis direction to the +X-axis direction.

According to an embodiment, the first segmented portions 612 and 613 separate the first conductive portion 611 from other conductive portions, and opposite ends of the first conductive portion 611 may be filled with an insulating material. In the structure for the first antenna pattern, one segmented portion 612, a first conductive portion 611, and another segmented portion 613 spaced apart from the camera bracket 315 are sequentially located along the edge of the support bracket 370.

According to an embodiment, some of the structures of the feeding part 520 and the first ground part 540 of the antenna structures of FIGS. 10 to 12 may be applicable to the structures of the first feeding part 620 and the $(1\text{-}1)^{th}$ ground part 640 of the first antenna structure 601. For example, the first feeding part 620 and the $(1\text{-}2)^{th}$ ground part 630 may extend inwardly from the first side wall 410 or the second side wall 420 of the housing 310. The first feeding part 620 may be electrically connected to the PCB 340 within the housing 310 to transmit a current to the first antenna pattern (e.g., the first conductive portion 611).

According to an embodiment, the first conductive portion 611 of FIGS. 13, 14 and 15 is for designing the first conductive portion 611 having a relatively great length compared to the conductive portion 511 of FIGS. 10, 11 and 12, and the (1-1)th ground part 640 and the first feeding part 620 may also be designed at various positions to be connected to the first conductive portion 611. For example, the first feeding part 620 may be designed near the second side wall 420 of the housing 310 or the first side wall 410 adjacent to the second side wall 420 in consideration of the mounting position of an internal component, and the $(1\text{-}1)^{th}$ ground part 640 may be designed to be adjacent to the second side wall 420 compared to the first ground part 540 of FIGS. 10, 11 and 12.

According to an embodiment, the $(1\text{-}2)^{th}$ ground part 630 may be disposed between the camera bracket 315 and the segmented part 611 adjacent to the camera bracket 315.

According to various embodiments, the second antenna structure 602 may include a second antenna pattern (e.g., the second conductive portion 711, a feeding part 720, and a $(2\text{-}1)^{th}$ ground part. The second antenna pattern may include a second conductive portion 711 disposed in an area adjacent to the camera bracket 315 and provided by the segmented portions 712 located at opposite ends of the second conductive portion 711. For example, when the side surface of the housing 310 is viewed, the second antenna structure 602 may be disposed to be spaced apart from the first antenna structure 601, with a side surface (e.g., the third side wall 430) connected to the camera bracket 315 interposed therebetween. Alternatively, when the rear surface of the electronic device 101 is viewed, the second antenna structure 602 may be provided to face the lower direction (e.g., in the −Y-axis direction) with reference to the camera bracket 315 disposed in the left upper end area of the electronic device.

According to an embodiment, the edge area of the support bracket 370 may include a third side wall 430 oriented in the −X-axis direction opposite to the +X-axis direction. The second conductive portion 711 for operating as an antenna may be at least a portion of a portion extending along the third side wall 430.

According to an embodiment, the second segmented portions 712 are structures for separating the second conductive portion 711 from other conductive portions, and opposite ends of the second conductive portion 711 may be filled with an insulating material. The second antenna pattern may include one segmented portion 712 spaced apart from the camera bracket 315, the second conductive portion 711, and another segmented portion which may be sequentially located along the edge of the housing 310.

According to an embodiment, some of the structures of the feeding part 520 and the second ground parts 530 and 530a of the antenna structures of FIGS. 10, 11 and 12 may be applicable to the structures of the second feeding part 720 and the $(2\text{-}2)^{th}$ ground part. For example, the second feeding part 720 and the $(2\text{-}2)^{th}$ ground part 730 may be portions extending inwardly from the third side wall 430 of the housing 310. The second feeding part 720 may be electrically connected to the PCB 340 within the housing 310 to transmit a current to the second antenna pattern (e.g., the second conductive portion 711. According to an embodiment, the $(2\text{-}2)^{th}$ ground part 730 may be disposed between the camera bracket 315 and the segmented part 711 adjacent to the camera bracket 315.

Figure 16A:
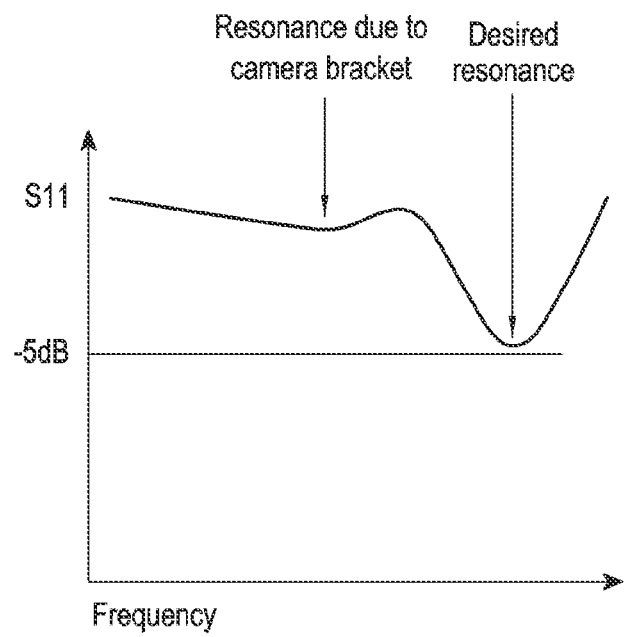
FIGS. 16A and 16B illustrate graphs related to antenna performance according to an embodiment and a comparative experiment, respectively.
Figure 16B:
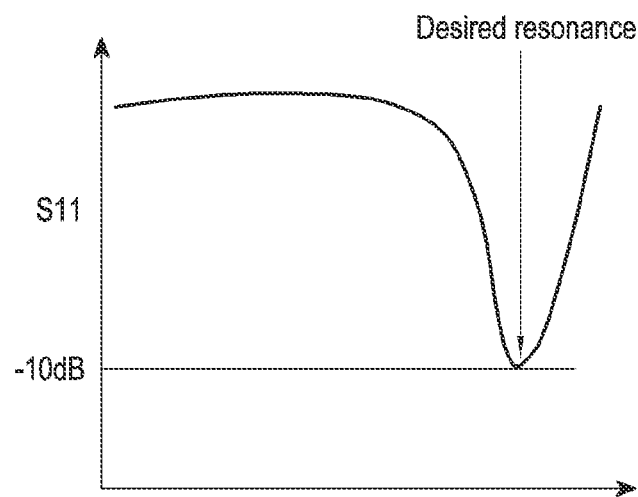

FIGS. 16A and 16B illustrate graphs related to antenna performance according to an embodiment and a comparative experiment, respectively.

FIG. 16A is an S1 graph of an antenna structure according to an embodiment, and FIG. 16B is an S11 graph of an antenna structure according to a comparative experiment.

According to various embodiments, the antenna structure may include an antenna pattern, a feeding part, and a ground part, and the antenna pattern may include a conductive part and a segmented portion. The side surface of the electronic device according to the disclosure may include a support bracket formed of metal and exposed to the outside, and the rear surface of the electronic device may be provided by a rear plate and a camera bracket.

According to various embodiments, in order to physically separate a side bracket (e.g., a conductive portion) used as an antenna structure from the camera bracket, a segmented part may be disposed between the conductive part and the camera bracket. In addition, in order to electrically separate the conductive part from the camera bracket, a ground part may be provided between the camera bracket and the segmented part. FIG. 16A illustrates an S11 graph according to an embodiment.

FIG. 16B illustrates an S11 graph of when a ground part is provided in a portion of a support bracket connected to the camera bracket or provided in another portion of a side surface of the support bracket (portion spaced apart from the side surface of the support bracket on which an antenna pattern is provided by the camera bracket).

Referring to FIG. 16B, it can be seen that, as undesired antenna resonance generated due to the length of the camera bracket is generated by the camera bracket other than the length of a conductive portion, an induced current is scattered and an antenna gain is decreased.

Referring to FIG. 16A, it can be seen that as the resonance caused by the camera bracket is removed, the antenna gain is increased compared to FIG. 16B. For example, it can be seen that the antenna gain is increased by about 5 decibels (dB).

An electronic device (e.g., the electronic device 101 in FIGS. 1 to 4) according to various embodiments of the present disclosure includes a housing (e.g., the housing 310 in FIG. 6) including a plate (e.g., the rear plate 311 in FIG. 6) including a first surface, and a support bracket (e.g., the support bracket 370 in FIG. 11) including a $(1-1)^{th}$ side wall (e.g., the $(1-1)^{th}$ side wall 411 in FIG. 11) extending from an edge of the first surface and a $(1-2)^{th}$ side wall (e.g., the $(1-2)^{th}$ side wall 412 in FIG. 11) separated from the $(1-1)^{th}$ side wall by a first segmented portion (e.g., the first segmented portion 512 in FIG. 11), a camera bracket connected to the $(1-2)^{th}$ side wall of the housing (e.g., the camera bracket 311a in FIG. 6), a printed circuit board (e.g., the printed circuit board 340 in FIG. 6) disposed within the housing. An antenna pattern (e.g., the antenna pattern of FIG. 11) formed on the support bracket may include a conductive portion (e.g., the conductive portion 511 in FIG. 11) forming at least a portion of the $(0-1)^{th}$ side wall, and a ground portion (e.g., the second ground portion 530 of FIG. 11) connected to the conductive portion may be located between the camera bracket and the first segmented portion.

According to various embodiments, the electronic device may further include a feeding part (e.g., the feeding part 520 in FIG. 11) extending to the inside of the housing from the $(1-1)^{th}$ side wall of the support bracket and electrically connected to the printed circuit board.

According to various embodiments, the first segmented portion may include an insulative material having a dielectric constant different from that of the conductive portion.

According to various embodiments, the first segmented portion may preventing a current transmitted from the feeding part so as not to be directed to the camera bracket.

According to various embodiments, the first segmented portion may be disposed at one end of the conductive portion and a second segmented portion (e.g., the second segmented portion 513 in FIG. 11) is disposed at the other end of the conductive portion, and the second segmented portion may be located on the same line as the $(1-1)^{th}$ side wall of the support bracket or on the same line as a second side wall perpendicular to the $(1-1)^{th}$ side wall.

According to various embodiments, wherein the ground portion is disposed to be spaced apart, by a second distance (e.g., the second distance d2 in FIG. 11), from a first portion (e.g., the interface I in FIG. 11) on the $(1-2)^{th}$ side wall toward the $(1-1)^{th}$ side wall.

According to various embodiments, the first segmented portion may be disposed to be spaced apart, by a first distance, from the first portion toward the $(1-1)^{th}$ side wall, and the first distance may be greater than the second distance.

According to various embodiments, the conductive portion is disposed to be spaced apart, by a first predetermined distance toward the $(1-1)^{th}$ side wall, from the first portion (e.g., the interface I in FIG. 11) on the $(1-2)^{th}$ side wall, which extends from an edge surface of the camera bracket, and the ground portion may be disposed to be spaced apart from the first portion toward the segmented portion.

According to various embodiments, the ground portion may be configured to electrically separate the $(1-1)^{th}$ side wall and the $(1-2)^{th}$ side wall.

According to various embodiments, the ground portion and the printed circuit board may be electrically connected to each other by a conductive member.

According to various embodiments, the electronic device may include a first ground part (e.g., the first ground part 540 in FIG. 11) disposed between the first segment part and the feeding part when viewed toward the $(1-1)^{th}$ side wall of the support bracket, wherein the first ground part may be configured to change an impedance for adjusting a frequency band.

According to various embodiments, the ground portion or the first ground part may be electrically connected to the printed circuit board.

According to various embodiments, the electronic device may include an antenna structure, wherein the ground portion, the first segmented portion, the first ground portion, and the feeding portion may be sequentially arranged from a first portion (e.g., the interface I in FIG. 11) on the $(1-2)^{th}$ side wall extending from an edge surface of the camera bracket toward the $(1-1)^{th}$ side wall to be spaced apart from each other.

According to various embodiments, the housing may include a recess structure, wherein the recess structure may include an opening in which at least a portion of a lens assembly of the camera module is located and an edge portion provided along the periphery of the opening, and the edge portion may be provided integrally with the plate.

According to various embodiments, the electronic device may further include a waterproof member disposed on one surface of the recess structure that is oriented in the first direction, the camera bracket stacked with the waterproof member, a lens protection member disposed on one surface of the recess structure that is oriented in the second direction, a support member stacked with the lens protection member, and an elastic member bonded to the support member.

According to various embodiments, the housing may include a recess structure that may be provided integrally with the support bracket.

An electronic device (e.g., the electronic device 101 in FIGS. 1 to 4) according to various embodiments of the disclosure may include a rear plate (e.g., the rear plate 311 in FIG. 6) disposed to cover the rear surface of the electronic device and including a recess structure provided in an edge area, a camera bracket (e.g., the camera bracket 311a in FIG. 6) disposed along the recess structure and at least partially exposed outward, a support bracket 370 (e.g., the support bracket 370 in FIG. 11) including a $(1-1)^{th}$ side wall (e.g., the $(1-1)^{th}$ side wall 411 in FIG. 11) connected to the rear plate and a $(1-2)^{th}$ side wall (e.g., the $(1-2)^{th}$ side wall 412 in FIG. 11) separated from the $(1-1)^{th}$ side wall and connected to the camera bracket, and an antenna pattern (e.g., the antenna pattern in FIG. 11) formed on the support bracket and including a conductive portion (e.g., the conductive portion 511 in FIG. 11) forming at least a portion of the $(1-1)^{th}$ side wall. At least one segmented portion (e.g., the segmented portion 520 in FIG. 11) located at one end of the conductive portion may be spaced apart, by a first distance toward the $(1-1)^{th}$ side wall, from a first portion (e.g., the interface I in FIG. 11) on the $(1-2)^{th}$ side wall extending from an edge surface of the camera bracket.

According to various embodiments, the electronic device may include a feeding part extending from the $(1-1)^{th}$ side wall of the support bracket to the inside of the electronic device and electrically connected to a printed circuit board, and a ground portion disposed adjacent to the at least one segmented portion.

According to various embodiments, the ground portion may be disposed to be spaced apart from the first portion toward the segmented portion.

According to various embodiments, the ground portion may be configured to electrically separate the (1-1)th side wall and the (1-2)th side wall.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device comprising:
a housing including a plate having a first surface, and a support bracket including a $(1-1)^{th}$ side wall extending from an edge of the first surface and a $(1-2)^{th}$ side wall separated from the $(1-1)^{th}$ side wall by a first segmented portion;
a camera bracket connected to the $(1-2)^{th}$ side wall of the housing; and
a printed circuit board (PCB) disposed within the housing,
wherein an antenna pattern formed on the support bracket includes a conductive portion forming at least a portion of the $(1-1)^{th}$ side wall,
wherein a ground portion connected to the conductive portion is located adjacent to the first segmented portion, and the ground portion is disposed between the camera bracket and the first segmented portion to electrically separate the conductive portion and the camera bracket,
wherein a feeding part is electrically connected to the PCB and the conductive portion, and
wherein the first segmented portion is located between the feeding part and the ground portion.

2. The electronic device of claim 1,
wherein the feeding part extends into the housing from the $(1-1)^{th}$ side wall of the support bracket and electrically connected to the PCB.

3. The electronic device of claim 2, wherein the first segmented portion includes an insulative material having a dielectric constant different from that of the conductive portion.

4. The electronic device of claim 2, wherein the first segmented portion prevents a current transmitted from the feeding part from being directed to the camera bracket.

5. The electronic device of claim 2, wherein the first segmented portion is disposed at one end of the conductive portion, and a second segmented portion is disposed on another end of the conductive portion, and
wherein the second segmented portion is located on a same line as the $(1-1)^{th}$ side wall of the support bracket or on a same line as a second side wall perpendicular to the $(1-1)^{th}$ side wall.

6. The electronic device of claim 2, wherein the ground portion is disposed to be spaced apart, by a second distance, from a first portion on the $(1-2)^{th}$ side wall toward the $(1-1)^{th}$ side wall.

7. The electronic device of claim 6,
wherein the first segmented portion is disposed to be spaced apart, by a first distance, from the a first portion toward the $(1-1)^{th}$ side wall, and
wherein the first distance is greater than the second distance.

8. The electronic device of claim 2, wherein the conductive portion is disposed to be spaced apart, by a first predetermined distance toward the $(1-1)^{th}$ side wall, from a first portion on the $(1-2)^{th}$ side wall, which extends from an edge surface of the camera bracket, and
wherein the ground portion is disposed to be spaced apart from the first portion toward the segmented portion.

9. The electronic device of claim 8, wherein the ground portion is configured to electrically separate the $(1-1)^{th}$ side wall and the $(1-2)^{th}$ side wall.

10. The electronic device of claim 8, wherein the ground portion and the PCB are electrically connected to each other by a conductive member.

11. The electronic device of claim 2, further comprising:
a first ground portion disposed between the first segmented portion and the feeding part when viewed toward the $(1-1)^{th}$ side wall of the support bracket, and configured to change an impedance for adjusting a frequency band.

12. The electronic device of claim 6, wherein the ground portion or the first ground part is electrically connected to the PCB.

13. The electronic device of claim 2, further comprising:
an antenna structure,
wherein the ground portion, the first segmented portion, the first ground portion, and the feeding portion are sequentially arranged from a first portion on the $(1-2)^{th}$ side wall extending from an edge surface of the camera bracket toward the $(1-1)^{th}$ side wall to be spaced apart from each other.

14. The electronic device of claim 2, wherein the housing includes a recess structure, wherein the recess structure includes an opening in which at least a portion of a lens assembly of the camera module is located and an edge portion provided along the periphery of the opening, and
wherein the edge portion is provided integrally with the plate.

15. The electronic device of claim 14, further comprising:
a waterproof member disposed on one surface of the recess structure that is oriented in the first direction;
the camera bracket stacked with the waterproof member;
a lens protection member disposed on one surface of the recess structure that is oriented in the second direction;
a support member stacked with the lens protection member; and
an elastic member bonded to the support member.

16. The electronic device of claim 2, wherein the housing includes a recess structure that is provided integrally with the support bracket.

17. An electronic device comprising:
a rear plate disposed to cover a rear surface of the electronic device and including a recess structure provided in an edge area;
a camera bracket disposed along the recess structure and at least partially exposed outward;
a support bracket including a first side wall connected to the rear plate and a second side wall separated from the first side wall and connected to the camera bracket; and
an antenna pattern formed on the support bracket and including a conductive portion forming at least a portion of the first side wall,
wherein at least one segmented portion located at one end of the conductive portion is spaced apart, by a first distance, toward the first side wall, from a first portion on the second side wall extending from the edge surface of the camera bracket,
wherein a ground portion connected to the conductive portion is located adjacent to the at least one segmented portion, and the ground portion is disposed between the camera bracket and the at least one segmented portion to electrically separate the conductive portion and the camera bracket,
wherein a feeding part is electrically connected to a printed circuit board (PCB) and the conductive portion, and
wherein the at least one segmented portion is located between the feeding part and the ground portion.

18. The electronic device of claim 17,
wherein the feeding part extends to an inside of the electronic device from the first side wall of the support bracket.

19. The electronic device of claim 18, wherein the ground portion is spaced apart from the first portion toward the segmented portion.

20. The electronic device of claim 18, wherein the ground portion is configured to electrically separate the first side wall and the second side wall.

* * * * *